US011949776B2

United States Patent
Ladd et al.

(10) Patent No.: US 11,949,776 B2
(45) Date of Patent: *Apr. 2, 2024

(54) ESTABLISHING A CRYPTOGRAPHIC TUNNEL BETWEEN A FIRST TUNNEL ENDPOINT AND A SECOND TUNNEL ENDPOINT WHERE A PRIVATE KEY USED DURING THE TUNNEL ESTABLISHMENT IS REMOTELY LOCATED FROM THE SECOND TUNNEL ENDPOINT

(71) Applicant: CLOUDFLARE, INC., San Francisco, CA (US)

(72) Inventors: Watson Bernard Ladd, Berkeley, CA (US); Vladislav Krasnov, Jersey City, NJ (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,333

(22) Filed: Jun. 12, 2023

(65) Prior Publication Data

US 2023/0327858 A1 Oct. 12, 2023

Related U.S. Application Data

(63) Continuation of application No. 17/158,787, filed on Jan. 26, 2021, now Pat. No. 11,677,545, which is a (Continued)

(51) Int. Cl.
*H04L 29/06* (2006.01)
*H04L 9/08* (2006.01)
(Continued)

(52) U.S. Cl.
CPC ............ *H04L 9/0825* (2013.01); *H04L 9/083* (2013.01); *H04L 9/0841* (2013.01);
(Continued)

(58) Field of Classification Search
CPC ..... H04L 9/0825; H04L 9/083; H04L 9/0841; H04L 9/3242; H04L 9/3297; H04L 12/4633; H04L 2209/76
See application file for complete search history.

(56) References Cited

U.S. PATENT DOCUMENTS 5,657,390 A 8/1997 Elgamal et al.
6,128,279 A 10/2000 O'Neil et al.
(Continued)

FOREIGN PATENT DOCUMENTS

EP 1533970 A1 5/2005
EP 1777907 B1 12/2007
(Continued)

OTHER PUBLICATIONS

Notice of Allowance, U.S. Appl. No. 13/251,023, dated Aug. 2, 2012, 18 pages.
(Continued)

*Primary Examiner* — Brandon Hoffman
*Assistant Examiner* — William A Corum, Jr.
(74) *Attorney, Agent, or Firm* — NICHOLSON DE VOS WEBSTER & ELLIOTT LLP

(57) ABSTRACT

A responder device receives, from an initiator device, a request to initiate a cryptographic tunnel between the initiator device and the responder device. The responder device does not include a static private key to be used in an asymmetric cryptography algorithm when establishing the tunnel. The responder device transmits a request to a key server that has access to the static private key and receives a response that is based on at least a result of at least one cryptographic operation using the static private key. The responder device receives from the key server, or generates, a transport key(s) for the responder device to use for sending and receiving data on the cryptographic tunnel. The
(Continued)

responder device transmits a response to the initiator device that includes information for the initiator device to generate a transport key(s) that it is to use for sending and receiving data on the cryptographic tunnel.

18 Claims, 16 Drawing Sheets

Related U.S. Application Data continuation of application No. 16/816,194, filed on Mar. 11, 2020, now Pat. No. 10,903,990.

(51) Int. Cl.
*H04L 9/32* (2006.01)
*H04L 12/46* (2006.01)

(52) U.S. Cl.
CPC .......... *H04L 9/3242* (2013.01); *H04L 9/3297* (2013.01); *H04L 12/4633* (2013.01)

(56) References Cited

U.S. PATENT DOCUMENTS

| | | |
|---|---|---|
| 6,442,687 B1 | 8/2002 | Savage |
| 6,643,701 B1 | 11/2003 | Aziz et al. |
| 6,785,542 B1 | 8/2004 | Blight et al. |
| 6,823,454 B1 | 11/2004 | Hind et al. |
| 6,976,176 B1 | 12/2005 | Schier |
| 7,096,352 B2 | 8/2006 | Kang et al. |
| 7,137,143 B2 | 11/2006 | Chawla et al. |
| 7,249,377 B1 | 7/2007 | Lita et al. |
| 7,320,073 B2 | 1/2008 | Zissimopoulos et al. |
| 7,454,457 B1 | 11/2008 | Lowery et al. |
| 7,543,146 B1 | 6/2009 | Karandikar et al. |
| 7,650,359 B2 | 1/2010 | Sato et al. |
| 7,673,331 B2 | 3/2010 | Kido et al. |
| 7,869,591 B1 | 1/2011 | Nagel et al. |
| 7,886,153 B2 | 2/2011 | Miyazawa |
| 7,917,758 B2 | 3/2011 | Palekar et al. |
| 7,921,292 B1 | 4/2011 | Pauker et al. |
| 8,275,790 B2 | 9/2012 | Fredricksen et al. |
| 8,327,128 B1 | 12/2012 | Prince et al. |
| 8,332,625 B2 | 12/2012 | Fritzges et al. |
| 8,527,757 B2 | 9/2013 | Lu et al. |
| 8,543,805 B2 | 9/2013 | Ovsiannikov |
| 8,615,795 B2 | 12/2013 | Cottrell et al. |
| 8,700,892 B2 | 4/2014 | Bollay et al. |
| 8,732,461 B2 | 5/2014 | Fujii et al. |
| 8,738,902 B2 | 5/2014 | Yoo et al. |
| 8,782,774 B1 | 7/2014 | Pahl et al. |
| 8,966,267 B1 | 2/2015 | Pahl et al. |
| 8,996,873 B1 | 3/2015 | Pahl et al. |
| 9,015,469 B2 | 4/2015 | Prince et al. |
| 9,049,247 B2 | 6/2015 | Holloway et al. |
| 9,184,911 B2 | 11/2015 | Pahl et al. |
| 9,385,864 B2 | 7/2016 | Pahl et al. |
| 9,450,950 B2 | 9/2016 | Pahl et al. |
| 9,553,856 B2 | 1/2017 | Pahl et al. |
| 9,680,807 B2 | 6/2017 | Pahl et al. |
| 10,009,183 B2 | 6/2018 | Pahl et al. |
| 10,033,529 B2 | 7/2018 | Pahl et al. |
| 10,129,224 B2 | 11/2018 | Pahl et al. |
| 10,594,496 B2 | 3/2020 | Pahl et al. |
| 11,038,849 B1* | 6/2021 | Alm ............... H04L 63/0428 |
| 2002/0016911 A1 | 2/2002 | Chawla et al. |
| 2003/0028495 A1 | 2/2003 | Pallante |
| 2004/0015725 A1 | 1/2004 | Boneh et al. |
| 2004/0054712 A1 | 3/2004 | Andreev et al. |
| 2004/0111600 A1 | 6/2004 | Kaler et al. |
| 2004/0133688 A1 | 7/2004 | Takamatsu |
| 2004/0161110 A1 | 8/2004 | Kanai et al. |
| 2004/0210756 A1 | 10/2004 | Mowers et al. |
| 2004/0268142 A1 | 12/2004 | Karjala et al. |
| 2005/0097362 A1 | 5/2005 | Winget et al. |
| 2005/0188220 A1 | 8/2005 | Nilsson et al. |
| 2005/0216736 A1 | 9/2005 | Smith |
| 2005/0257045 A1 | 11/2005 | Bushman et al. |
| 2005/0262357 A1 | 11/2005 | Araujo et al. |
| 2005/0273849 A1 | 12/2005 | Araujo et al. |
| 2005/0283443 A1 | 12/2005 | Hardt |
| 2005/0283614 A1 | 12/2005 | Hardt |
| 2005/0289084 A1 | 12/2005 | Thayer et al. |
| 2006/0005017 A1 | 1/2006 | Black et al. |
| 2006/0005237 A1 | 1/2006 | Kobata et al. |
| 2006/0005239 A1 | 1/2006 | Mondri et al. |
| 2006/0155855 A1 | 7/2006 | Hamai |
| 2006/0161644 A1 | 7/2006 | Adelman et al. |
| 2006/0212697 A1 | 9/2006 | Sato et al. |
| 2006/0294366 A1 | 12/2006 | Nadalin et al. |
| 2007/0060097 A1 | 3/2007 | Edge et al. |
| 2007/0074282 A1 | 3/2007 | Black et al. |
| 2007/0150418 A1 | 6/2007 | Ben-Menahem et al. |
| 2007/0157027 A1 | 7/2007 | Palekar et al. |
| 2007/0189279 A1 | 8/2007 | Thalanany et al. |
| 2008/0022043 A1 | 1/2008 | Adams et al. |
| 2008/0022085 A1 | 1/2008 | Hiltgen |
| 2008/0134311 A1 | 6/2008 | Medvinsky et al. |
| 2008/0189773 A1 | 8/2008 | Maiorano et al. |
| 2008/0263215 A1 | 10/2008 | Schnellbaecher |
| 2008/0306875 A1 | 12/2008 | Mardikar |
| 2009/0055284 A1 | 2/2009 | Takayama |
| 2009/0092247 A1 | 4/2009 | Kido et al. |
| 2009/0132806 A1 | 5/2009 | Blommaert et al. |
| 2009/0158040 A1 | 6/2009 | Chaudhary et al. |
| 2009/0232315 A1 | 9/2009 | Bandaram et al. |
| 2009/0307759 A1 | 12/2009 | Schnell et al. |
| 2009/0327116 A1 | 12/2009 | Cunningham et al. |
| 2009/0327696 A1 | 12/2009 | Hatlelid et al. |
| 2010/0017848 A1 | 1/2010 | Pomerantz |
| 2010/0111300 A1 | 5/2010 | Kido et al. |
| 2010/0223456 A1 | 9/2010 | Schneider |
| 2010/0274836 A1 | 10/2010 | Orentas et al. |
| 2011/0154019 A1 | 6/2011 | Wang |
| 2011/0179286 A1 | 7/2011 | Spalka et al. |
| 2011/0264905 A1 | 10/2011 | Ovsiannikov |
| 2012/0131329 A1 | 5/2012 | Liang et al. |
| 2012/0174196 A1 | 7/2012 | Bhogavilli et al. |
| 2012/0209942 A1 | 8/2012 | Zehavi et al. |
| 2012/0254622 A1 | 10/2012 | Kanungo |
| 2012/0311322 A1 | 12/2012 | Koyun et al. |
| 2013/0031356 A1 | 1/2013 | Prince et al. |
| 2013/0097687 A1 | 4/2013 | Storm |
| 2013/0124866 A1 | 5/2013 | Farrugia et al. |
| 2013/0156189 A1 | 6/2013 | Gero et al. |
| 2013/0219166 A1 | 8/2013 | Ristov et al. |
| 2013/0305036 A1 | 11/2013 | Vos |
| 2014/0044265 A1 | 2/2014 | Kocher et al. |
| 2014/0098960 A1 | 4/2014 | Xu et al. |
| 2014/0259147 A1 | 9/2014 | Alleman et al. |
| 2015/0039890 A1 | 2/2015 | Khosravi et al. |
| 2015/0067338 A1 | 3/2015 | Gero et al. |
| 2016/0065374 A1 | 3/2016 | Sauerwald et al. |
| 2016/0080337 A1 | 3/2016 | Pahl et al. |
| 2016/0261411 A1 | 9/2016 | Yau et al. |
| 2019/0044731 A1* | 2/2019 | Thomas ............ H04L 9/0819 |
| 2019/0044924 A1 | 2/2019 | Pahl et al. |
| 2019/0260723 A1 | 8/2019 | Daniel |
| 2020/0162269 A1 | 5/2020 | Nix |

FOREIGN PATENT DOCUMENTS

| | | |
|---|---|---|
| WO | 2004/036360 A2 | 4/2004 |
| WO | 2004/091166 A1 | 10/2004 |
| WO | 2006/006324 A1 | 1/2006 |
| WO | 2013/090894 A1 | 6/2013 |

OTHER PUBLICATIONS

Office Action received for European Application No. 14759676.1, dated Aug. 21, 2019, 6 pages.

(56) References Cited

OTHER PUBLICATIONS

Office Action, EP App. No. 14759676.1, dated Apr. 28, 2021, 5 pages.
Office Action, EP App. No. 14759676.1, dated Sep. 12, 2018, 5 pages.
Requirement for Restriction/Election from U.S. Appl. No. 15/413,187, dated Jan. 26, 2018, 9 pages.
Requirement for Restriction/Election, U.S. Appl. No. 15/413,187, dated Jan. 26, 2018, 9 pages.
RFC 3546: Blake-Wilson S., "Network Working Group, Transport Layer Security (TLS) Extensions," Request for comments: 3546, 2003, pp. 1-29.
Salowey et al., "Transport Layer Security (TLS) Session Resumption without Server-Side State", Network Working Group, Request for Comments: 5077, Jan. 2008, 20 pages.
Supplemental Notice of Allowance for U.S. Appl. No. 14/248,253, dated Feb. 18, 2015, 06 pages.
Supplemental Notice of Allowance, U.S. Appl. No. 14/248,253, dated Feb. 18, 2015, 6 pages.
Wireguard, "Protocol & Cryptography", Available Online at <https://www.wireguard.com/protocol/>, Retrieved on Mar. 11, 2020, pp. 1-8.
Wu, Peter, "Analysis of the WireGuard protocol", Master's Thesis, Analysis of the WireGuard protocol, Eindhoven University of Technology, Jun. 17, 2019, 89 pages.
Non-Final Office Action, U.S. Appl. No. 14/248,254, dated Jul. 8, 2014, 11 pages.
Non-Final Office Action, U.S. Appl. No. 14/315,241, dated Jul. 28, 2015, 16 pages.
Non-Final Office Action, U.S. Appl. No. 14/630,585, dated Sep. 30, 2015, 8 pages.
Non-Final Office Action, U.S. Appl. No. 14/937,805, dated May 6, 2016, 36 pages.
Non-Final Office Action, U.S. Appl. No. 15/202,371, dated Sep. 13, 2017, 12 pages.
Non-Final Office Action, U.S. Appl. No. 15/202,371, dated Sep. 21, 2016, 17 pages.
Non-Final Office Action, U.S. Appl. No. 15/413, 187, dated Aug. 4, 2017, 12 pages.
Non-Final Office Action, U.S. Appl. No. 16/043,972, dated Aug. 28, 2019, 21 pages.
Non-Final Office Action, U.S. Appl. No. 16/043,972, dated May 20, 2020, 9 pages.
Non-Final Office Action, U.S. Appl. No. 16/188,244, dated Dec. 19, 2019, 27 pages.
Non-Final Office Action, U.S. Appl. No. 16/816,194, dated Jun. 9, 2020, 9 pages.
Non-Final Office Action, U.S. Appl. No. 17/036,988, dated Mar. 10, 2022, 5 pages.
Non-Final Office Action, U.S. Appl. No. 18/092,750, dated May 19, 2023, 10 pages.
Notice of Allowability, U.S. Appl. No. 16/159,437, dated Jun. 2, 2020, 8 pages.
Notice of Allowance for U.S. Appl. No. 14/630,585, dated Mar. 2, 2016, 12 pages.
Notice of Allowance from U.S. Appl. No. 13/193,574, dated Dec. 22, 2014, 7 pages.
Notice of Allowance from U.S. Appl. No. 14/692,397, dated Jul. 6, 2018, 13 pages.
Notice of Allowance from U.S. Appl. No. 14/692,397, dated Nov. 14, 2018, 13 pages.
Notice of Allowance from U.S. Appl. No. 15/413,187, dated Jul. 16, 2018, 24 pages.
Notice of Allowance, May 18, 2016 for U.S. Appl. No. 14/675,385, filed Mar. 31, 2015, 29 pages.
Notice of Allowance, U.S. Appl. No. 16/159,437, dated Dec. 31, 2019, 10 pages.
Notice of Allowance, U.S. Appl. No. 13/788,784, dated Feb. 18, 2014, 11 pages.
Notice of Allowance, U.S. Appl. No. 14/248,253, dated Jul. 14, 2014, 22 pages.
Notice of Allowance, U.S. Appl. No. 14/248,253, dated Oct. 30, 2014, 8 pages.
Notice of Allowance, U.S. Appl. No. 14/248,254, dated Jul. 6, 2015, 9 pages.
Notice of Allowance, U.S. Appl. No. 14/248,256, dated Jun. 23, 2014, 11 pages.
Notice of Allowance, U.S. Appl. No. 14/248,256, dated Oct. 8, 2014, 11 pages.
Notice of Allowance, U.S. Appl. No. 14/315,241, dated Jan. 22, 2016, 20 pages.
Notice of Allowance, U.S. Appl. No. 14/315,241, dated Sep. 23, 2016, 16 pages.
Notice of Allowance, U.S. Appl. No. 14/630,585, dated Mar. 2, 2016, 12 pages.
Notice of Allowance, U.S. Appl. No. 14/675,385, dated May 18, 2016, 29 pages.
Notice of Allowance, U.S. Appl. No. 14/937,805, dated Aug. 24, 2016, 7 pages.
Notice of Allowance, U.S. Appl. No. 14/937,805, dated Feb. 15, 2017, 12 pages.
Notice of Allowance, U.S. Appl. No. 15/202,371, dated Apr. 11, 2017, 16 pages.
Notice of Allowance, U.S. Appl. No. 15/202,371, dated Mar. 27, 2018, 14 pages.
Notice of Allowance, U.S. Appl. No. 15/271,190, dated Feb. 27, 2018, 14 pages.
Notice of Allowance, U.S. Appl. No. 15/271,190, dated Oct. 23, 2017, 15 pages.
Notice of Allowance, U.S. Appl. No. 15/413,187, dated Jul. 16, 2018, 24 pages.
Notice of Allowance, U.S. Appl. No. 16/019,109, dated Nov. 12, 2019, 19 pages.
Notice of Allowance, U.S. Appl. No. 16/019,109, dated Nov. 12, 2019, 5 pages.
Notice of Allowance, U.S. Appl. No. 16/043,972, dated Feb. 24, 2021, 18 pages.
Notice of Allowance, U.S. Appl. No. 16/188,244, dated May 20, 2020, 9 pages.
Notice of Allowance, U.S. Appl. No. 16/356,304, dated Jan. 15, 2021, 2 pages.
Notice of Allowance, U.S. Appl. No. 16/356,304, dated Nov. 30, 2020, 9 pages.
Notice of Allowance, U.S. Appl. No. 16/816,194, dated Sep. 22, 2020, 8 pages.
Notice of Allowance, U.S. Appl. No. 16/820,489, dated Apr. 29, 2022, 13 pages.
Notice of Allowance, U.S. Appl. No. 17/036,988, dated Sep. 14, 2022, 10 pages.
Notice of Allowance, U.S. Appl. No. 17/158,787, dated Jan. 25, 2023, 10 pages.
Advisory Action from U.S. Appl. No. 13/193,574, dated Jun. 5, 2014, 13 pages.
Advisory Action from U.S. Appl. No. 14/692,397, dated May 1, 2018, 3 pages.
Bjorn Edstrom., et al., blog.bjm.se: Fun with the TLS handshake, Programming and stuff, 2012, 11 pages.
Blake-Wilson et al., "Elliptic Curve Cryptography (ECC) Cipher Suites for Transport Layer Security (TLS)", Network Working Group, Request for Comments: 4492, May 2006, 35 pages.
Blake-Wilson et al., Request for Comments: 3546, Network Working Group, Transport Layer Security (TLS) Extensions, Jun. 2003, 30 pages.
Blake-Wilson, et al., Request for Comments: 4366, Network Working Group, Transport Layer Security (TLS) Extensions, Apr. 2006, 31 pages.
Blake-Wilson, S., Nystrom, M., Hopwood, D., Mikkelsen, J., and T. Wright, "Transport Layer Security (TLS) Extensions", RFC 3546, Jun. 2003.
Chen et al., "Pretty-Bad-Proxy: An Overlooked Adversary in Browsers' HTTPS Deployments," 2009, IEEE—Computer Society, pp. 347-359.

(56) References Cited

OTHER PUBLICATIONS

Communication pursuant to Article 94(3) EPC, EP App. No. 14759676. 1, dated Aug. 21, 2019, 6 pages.
Communication pursuant to Article 94(3) EPC, EP App. No. 14759676. 1, dated Jun. 8, 2020, 5 pages.
Cooley et al., "Secure Channel Establishment in Disadvantaged Networks," 2010, IEEE, pp. 32-38.
Corrected Notice of Allowance, U.S. Appl. No. 13/788,784, dated May 21, 2014, 13 pages.
Decision to grant a European patent, EP App. No. 14759676.1, dated Sep. 1, 2022, 2 pages.
Dierks et al., "The TLS Protocol Version 1.0", Network Working Group, Request for Comments: 2246, Jan. 1999, 81 pages.
Dierks et al., "The Transport Layer Security (TLS) Protocol, Version 1.1", Network Working Group, Request for Comments: 4346, Apr. 2006, 87 pages.
Dierks et al., "The Transport Layer Security (TLS) Protocol, Version 1.2", Network Working Group, Request for Comments: 5246, Aug. 2008, 104 pages.
Donenfeld, Jason A., "WireGuard: Next Generation Kernel Network Tunnel", Available Online <https://www.wireguard.com/papers/wireguard.pdf>, Jun. 30, 2018, pp. 1-20.
E. Rescorla, Request for Comments: 2818, Network Working Group, HTTP Over TLS, May 2000, 8 pages.
Edstrom B., et al., "blog.bjm.se: Fun with the TLS handshake, Programming and stuff," Jul. 28, 2012, 11 pages.
El Sawda et al., "SIP Security Attacks and Solutions: A State-of-the-art Review," 2006, IEEE, pp. 3187-3191.
European Search Report and Search Opinion, EP App. No. 14759676. 1, dated Jan. 13, 2017, 7 pages.
Final Office Action from U.S. Appl. No. 13/193,574, dated Mar. 27, 2014, 12 pages.
Final Office Action from U.S. Appl. No. 14/692,397, dated Dec. 2, 2016, 15 pages.
Final Office Action from U.S. Appl. No. 14/692,397, dated Dec. 5, 2017, 18 pages.
Final Office Action from U.S. Appl. No. 14/692,397, dated May 20, 2016, 18 pages.
Final Office Action, U.S. Appl. No. 14/248,254, dated Dec. 10, 2014, 12 pages.
Final Office Action, U.S. Appl. No. 16/043,972, dated Feb. 10, 2020, 12 pages.
Final Office Action, U.S. Appl. No. 16/043,972, dated Sep. 24, 2020, 9 pages.
Final Office Action, U.S. Appl. No. 18/092,750, dated Sep. 6, 2023, 12 pages.
Freier A., et al., "The Secure Sockets Layer (SSL) Protocol Version 3.0," Internet Engineering Task Force (IETF), Request for Comments: 6101, 2011, 67 pages.
Freier et al., "The Secure Sockets Layer (SSL) Protocol Version 3.0", Internet Engineering Task Force (IETF), Request for Comments: 6101, Aug. 2011, 67 pages.
Henk et al., "Controlled Disclosure of Context Information Across Ubiquitous Computing Domains," 2008, IEEE, pp. 98-105.
Intention to grant, EP App. No. 14759676.1, dated Mar. 31, 2022, 8 pages.
International Preliminary Report on Patentability for Application No. PCT/US14/21434, dated Sep. 17, 2015, 8 pages.
International Preliminary Report on Patentability, PCT App. No. PCT/US2014/021434, dated Sep. 17, 2015, 8 pages.
International Search Report and Written Opinion, PCT App. No. PCT/US2014/021434, dated Apr. 14, 2014, 10 pages.
Jager et al., "On the Security of TLS-DHE in the Standard Model," CRYPTO 2012, LNCS 7417, International Association for Cryptologic Research, 2012, pp. 273-293.
Non Final Office Action for U.S. Appl. No. 14/248,254, dated Jul. 8, 2014, 11 pages.
Non-Final Office Action from U.S. Appl. No. 13/193,574, dated Jul. 17, 2014, 11 pages.
Non-Final Office Action from U.S. Appl. No. 13/193,574, dated Nov. 25, 2013, 15 pages.
Non-Final Office Action from U.S. Appl. No. 13/251,023, dated Feb. 10, 2012, 15 pages.
Non-Final Office Action from U.S. Appl. No. 15/413,187, dated Aug. 4, 2017, 12 pages.
Non-Final Office Action from U.S. Appl. No. 14/692,397, dated May 18, 2018, 19 pages.
Non-Final Office Action from U.S. Appl. No. 14/692,397, dated May 19, 2017, 15 pages.
Non-Final Office Action from U.S. Appl. No. 14/692,397, dated Sep. 15, 2015, 19 pages.
Non-Final office action from U.S. Appl. No. 16/043,972, dated Aug. 28, 2019, 21 pages.
Non-Final Office Action, U.S. Appl. No. 13/788,784, dated Jul. 11, 2013, 13 pages.
Non-Final Office Action, U.S. Appl. No. 13/788,784, dated Nov. 25, 2013, 12 pages.

* cited by examiner

ESTABLISHING A CRYPTOGRAPHIC TUNNEL BETWEEN A FIRST TUNNEL ENDPOINT AND A SECOND TUNNEL ENDPOINT WHERE A PRIVATE KEY USED DURING THE TUNNEL ESTABLISHMENT IS REMOTELY LOCATED FROM THE SECOND TUNNEL ENDPOINT

CROSS-REFERENCE TO RELATED APPLICATIONS

This application is a continuation of U.S. Pat. No. 17,158,787, filed Jan. 26, 2021, which is a continuation of U.S. application Ser. No. 16/816,194, filed Mar. 11, 2020, now U.S. Pat. No. 10,903,990, which is hereby incorporated by reference.

FIELD

Embodiments relate to the field of network communications; and more specifically, to establishing a cryptographic tunnel between a first tunnel endpoint and a second tunnel endpoint where a private key used during the tunnel establishment is remotely located from the second tunnel endpoint.

BACKGROUND

There are several different ways to provide a secure network connection between two computing devices. Secure Sockets Layer (SSL) and Transport Layer Security (TLS), which is the successor to SSL, are commonly used to provide secure network connections. SSL and/or TLS are commonly used during web browsing (e.g., using HTTPS), email, and other Internet applications. SSL and TLS are described in several Request For Comments (RFCs), including RFC 2246 (describing TLS 1.0), RFC 4346 (describing TLS 1.1), RFC 5246 (describing TLS 1.2), and RFC 6101 (describing SSL 3.0). An SSL or TLS client and server negotiate a set of parameters to establish a secure session in a process called a handshake. The handshake uses public key cryptography during the handshake where a private key is used to perform a private key operation (e.g., signing cryptographic information, decrypting an encrypted premaster secret). Other common protocols for establishing a cryptographic connection include Secure Shell (SSH) and IPsec that also use a private key to perform a private key operation. Other, less common means of establishing a secure network connection such as the Noise protocol exist.

SUMMARY

A cryptographic tunnel is established between a first tunnel endpoint and a second tunnel endpoint where a private key used during the tunnel establishment is remotely located from the second tunnel endpoint. A responder device receives, from an initiator device, a first request to initiate a cryptographic tunnel between the initiator device and the responder device, where establishing the cryptographic tunnel includes use of an asymmetric cryptography algorithm, and where the responder device does not include a static private key to be used in the asymmetric cryptography algorithm. The responder device transmits a second request to a key server that has access to the static private key to be used in the asymmetric cryptography algorithm, where the second request is requesting the key server to use the static private key in at least one cryptographic operation of the asymmetric cryptography algorithm. The responder device receives, from the key server, a first response that is based on at least a result of the at least one cryptographic operation of the asymmetric cryptography algorithm using the static private key. The responder device receives from the key server, or generates, a first set of one or more transport keys for the responder device to use for sending and receiving data on the cryptographic tunnel. The responder device transmits a second response to the initiator device that includes information for the initiator device to generate a second set of one or more transport keys that it is to use for sending and receiving data on the cryptographic tunnel. The responder device receives, from the initiator device, a first encrypted data packet over the cryptographic tunnel and decrypts the first encrypted data packet using at least one of the first set of one or more transport keys to reveal a first data packet. The responder device processes the first data packet. The responder device encrypts a second data packet using at least one of the first set of one or more transport keys and transmits the encrypted second data packet over the cryptographic tunnel to the initiator device. The at least one cryptographic operation of the asymmetric cryptography algorithm using the static private key may be a Diffie-Hellman computation that affects at least the generation of the second set of one or more transport keys.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A method and apparatus is described for establishing a cryptographic tunnel between a first tunnel endpoint and a second tunnel endpoint where a private key used during the tunnel establishment is located remotely from the device of the second tunnel endpoint. The first tunnel endpoint is located on a device that is referred herein as an initiator device. The initiator device initiates the establishment of the tunnel. The second tunnel endpoint is located on a device that is referred herein as a responder device. The initiator device and the responder device establish the tunnel through a handshake that uses public key cryptography. In conventional solutions, the responder device has local access to the private key that is used when establishing the tunnel. However, in embodiments described herein, the responder device does not have local access to the private key that is used when establishing the tunnel; instead the private key is located remotely on a device that is referred herein as a key server.

In an embodiment, upon a point during the handshake between the initiator device and the responder device, the responder device requests the key server to at least access and use the private key to perform one or more private key operations. The key server may also perform one or more other operations of the handshake such as generating one or more transport keys to be used by the responder device for decrypting and/or encrypting transport data received over the tunnel.

Figure 1:
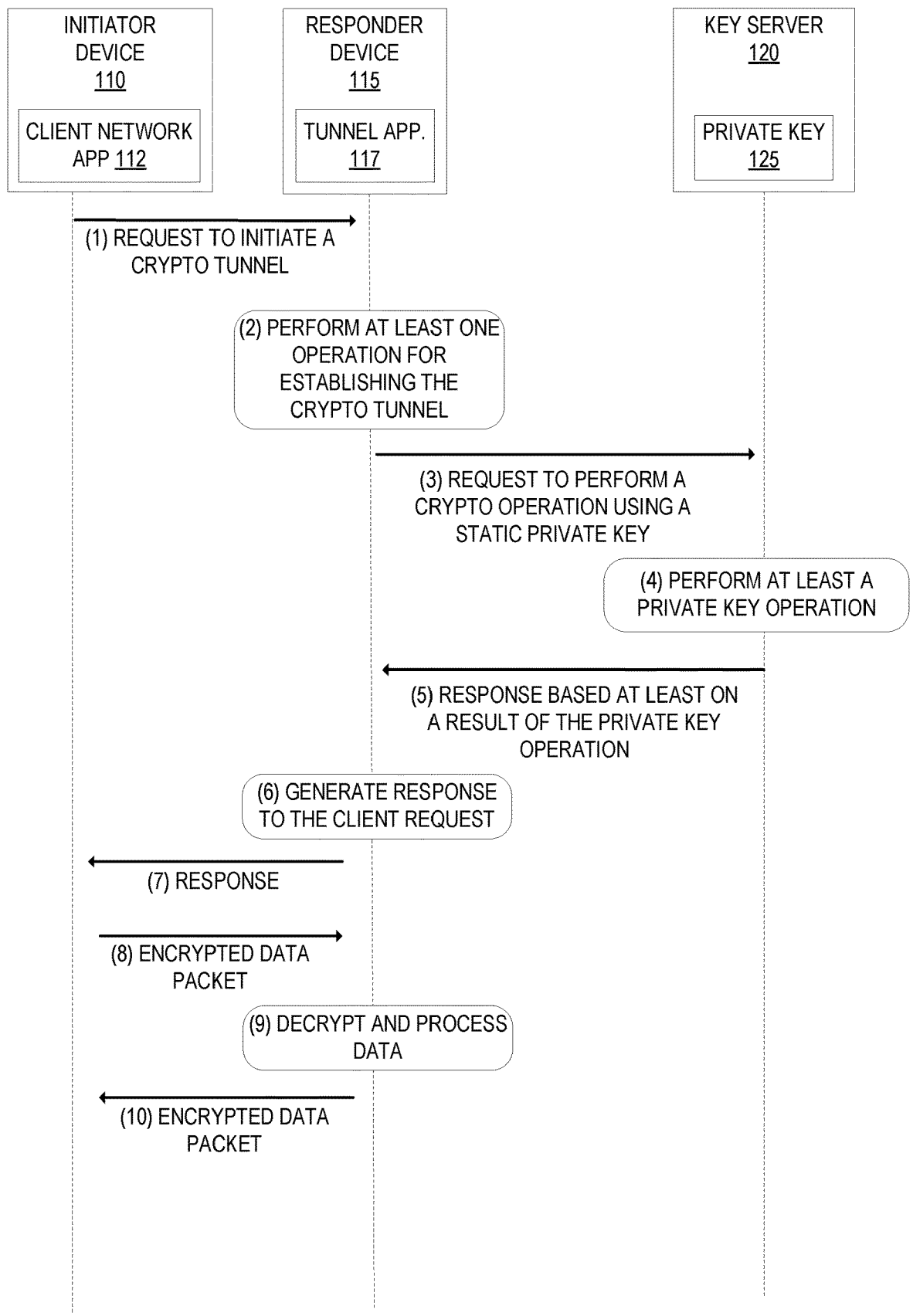
FIG. 1 illustrates a sequence diagram that illustrates exemplary operations for establishing a cryptographic tunnel between an initiator device and a responder device where a private key used during the tunnel establishment is not locally available to the responder device according to an embodiment.

FIG. 1 illustrates a sequence diagram that illustrates exemplary operations for establishing a cryptographic tunnel between an initiator device and a responder device where a private key used during the tunnel establishment is not locally available to the responder device according to an embodiment. FIG. 1 includes the initiator device 110, the responder device 115, and the key server 120. The initiator device 110 is initiating a cryptographic tunnel with the responder device 115. An asymmetric cryptography algorithm is used for establishing the cryptographic tunnel. The initiator device 110 is a computing device (e.g., desktop, laptop, smartphone, mobile phone, tablet, gaming system, set-top box, server, etc.) that includes a client network application 112 (e.g., a web browser, a mobile application, or other application) that is capable of accessing network resources and is capable of acting as an initiator in a tunneling protocol. The use of the term "client network application" does not require that the initiator device 110 be an end-user client device. The client network application 112 will act as the first tunnel endpoint of the tunnel.

The responder device 115 is a computing device that includes the tunnel application 117 that establishes the tunnel with the client network application 112 of the initiator device 110. The responder device 115 may be a server device. The tunnel application 117 will act as the second tunnel endpoint of the tunnel. The responder device 115 does not store the static private key of the responder that is used in the asymmetric cryptographic algorithm during the tunnel establishment. Instead, the static private key is stored or available to the key server 120 (e.g., the private key 125). However, the responder device 115 does have access to the static public key that corresponds to the static private key. The key server 120 is a computing device that includes the private key 125 and performs at least a private key operation for establishing the tunnel between the initiator device 110 and the responder device 115.

The initiator device 110 and the responder device 115 may perform pre-messaging computations before starting the handshake for establishing the tunnel. For instance, the tunnel application 117 may transmit a public key (that corresponds with the private key 125) to the client network application 112. Alternatively, the client network application 112 may obtain the public key through a public key repository or through other ways. The tunnel application 117 and the client network application 112 may compute one or more values that are used during the handshake. For instance, they may each compute an initial chaining value and initial hash values. The client network application 112 and the tunnel application 117 may each generate an ephemeral key pair (an ephemeral public key and ephemeral private key) for the handshake. The ephemeral keys may be a Curve25519 private and public keys. The ephemeral keys may be used in a series of Diffie-Hellman computations.

At operation 1, the client network application 112 of the initiator device 110 transmits a request to initiate a cryptographic tunnel to the responder device 115 that is received at the tunnel application 117. In a specific example, the request may be a handshake initiation message if the WireGuard® protocol is used. The request may include one or more values used during the connection establishment (e.g., one or more of a sender index, an ephemeral public key of the initiator, an encrypted static public key of the initiator, an encrypted timestamp, a first message authentication code (MAC), and a second MAC).

The tunnel application 117 of the responder device 115 receives the request to initiate the cryptographic tunnel. As described above, in conventional solutions the responder device has local access to a static private key that is used when establishing the tunnel. However, in embodiments described herein, the responder device 115 does not have local access to the static private key that is used when establishing the tunnel. Instead, the private key 125 is located at the key server 120. At operation 2, the tunnel application 117 performs at least one operation for establishing the cryptographic tunnel. In an embodiment, the tunnel application 117 performs each operation up until the point where the private key is required to perform one or more private key operations. In another embodiment, the tunnel application 117 performs less than each operation up until the point where the private key is required to perform one or more private key operations.

At operation 3, the responder device 115 transmits a request to the key server 120, the request for performing at least one cryptographic operation using a static private key (e.g., the private key 125). The request may also include other information that may be required for processing the cryptographic operation. For instance, if the cryptographic operation is a Diffie-Hellman computation that uses the private key and other data that is generated for the handshake (e.g., an ephemeral public key of the initiator device 110), the request may include the other data for the handshake in which the key server 120 cannot independently derive.

The key server 120 receives the request to perform the at least one cryptographic operation. The key server 120 processes the request including performing at least one cryptographic operation. In an embodiment, the key server 120 performs at least two cryptographic operations using the private key (e.g., two Diffie-Hellman computations using the static private key 125). The key server 120 may perform one or more additional operations to the cryptographic operations including generating the transport keys for the tunnel application 117 to use when receiving and sending data over the cryptographic tunnel between the client network application 112 and the tunnel application 117. At operation 5, the key server 120 transmits a response based at least on a result of the private key operation. The response may include the direct value of the result of the private key operation and/or may include one or more values that are derived/computed using the result of the private key operation.

The responder device 115 receives the response from the key server 120. The responder device 115 generates a response to the client request to initiate the cryptographic tunnel at operation 6. The tunnel application 117 may perform one or more operations to generate the response. For instance, if not generated and received from the key server 120, the tunnel application 117 may generate the transport keys to use when receiving and sending data over the cryptographic tunnel between the client network application 112 and the tunnel application 117. The response may include information for the initiator device 110 to generate transport keys that it is to use for sending and receiving data on the cryptographic tunnel. Although not illustrated in FIG. 1, prior to generating the response to the client request, the responder device 115 may transmit one or more additional requests to the key server 120 to perform one or more additional private key operations, and receive one or more responses from the key server 120 accordingly. At operation 7, the responder device 115 transmits the response to the initiator device 110.

The client network application 112 of the initiator device 110 receives and processes the response including generating the transport keys to use when receiving and sending data over the cryptographic tunnel. At operation 8, the client network application 112 transmits an encrypted data packet over the cryptographic tunnel to the tunnel application 117. The data packet is encrypted with the transport key of the client network application 112 used for sending data over the cryptographic tunnel.

The tunnel application 117 receives the encrypted data packet, decrypts the encrypted data packet to reveal the data packet, and processes the data, at operation 9. The tunnel application 117 uses the transport key for receiving data to decrypt the encrypted data packet (either generated by the tunnel application 117 or received from the key server 120). At operation 10, the tunnel application 117 transmits an encrypted data packet over the cryptographic tunnel to the client network application 112. The data packet is encrypted with the transport key of the tunnel application 117 used for sending data over the cryptographic tunnel. The client network application 112 receives, decrypts, and processes the encrypted data packet.

Although FIG. 1 shows the client network application 112 transmitting an encrypted data packet to the tunnel application 117 in operation 8 prior to the tunnel application 117 transmitting an encrypted data packet to the client network application 112 in operation 10, the order of these packets may be switched. In other words, the tunnel application 117 may transmit an encrypted data packet over the established tunnel to the client network application 112 before the client network application 112 transmits an encrypted data packet over the established tunnel to the tunnel application 117.

Figure 2:
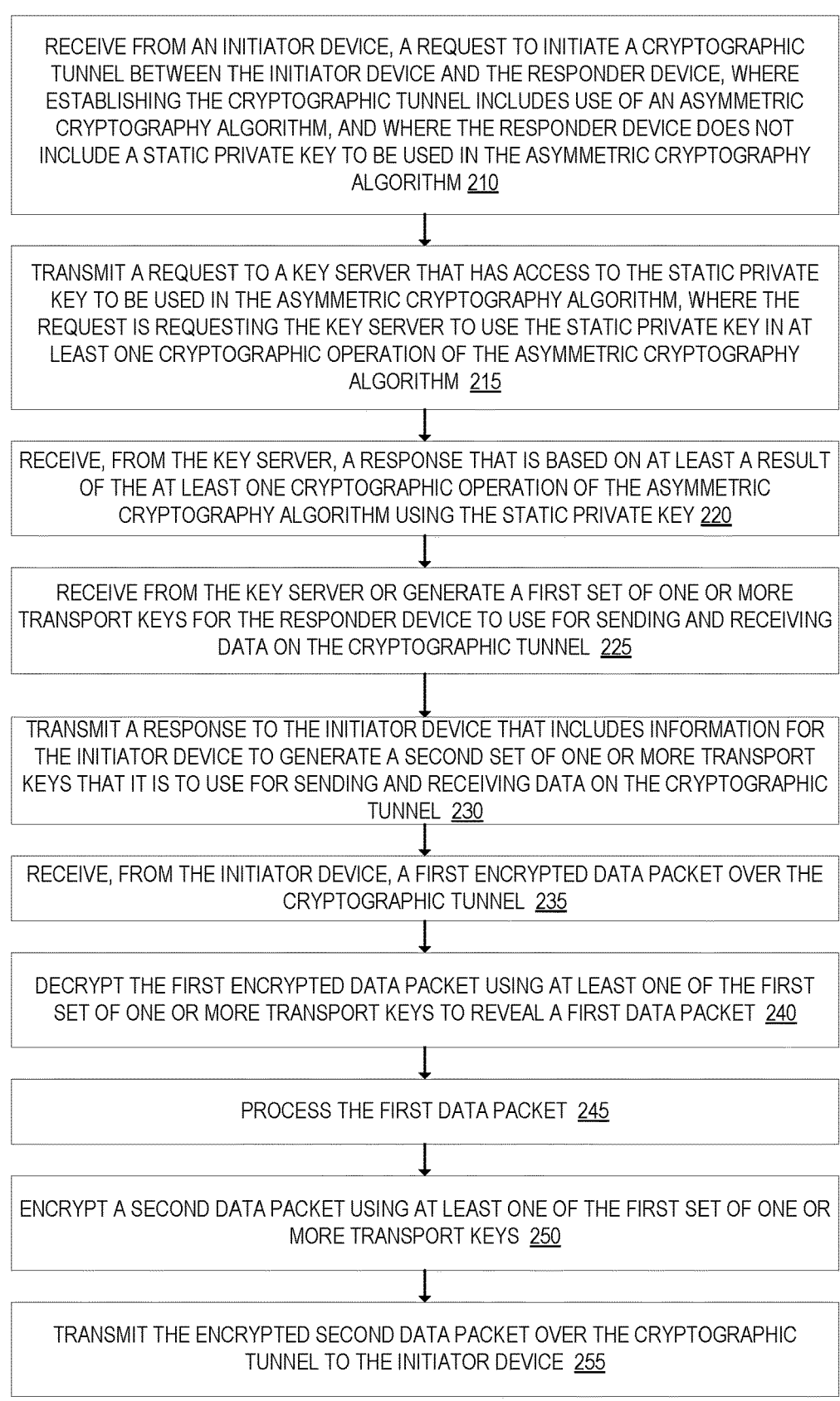
FIG. 2 is a flow diagram that illustrates exemplary operations for establishing a cryptographic tunnel between an initiator device and a responder device where the responder device does not have local access to a static private key used during the tunnel establishment, according to an embodiment.
Figure 3:
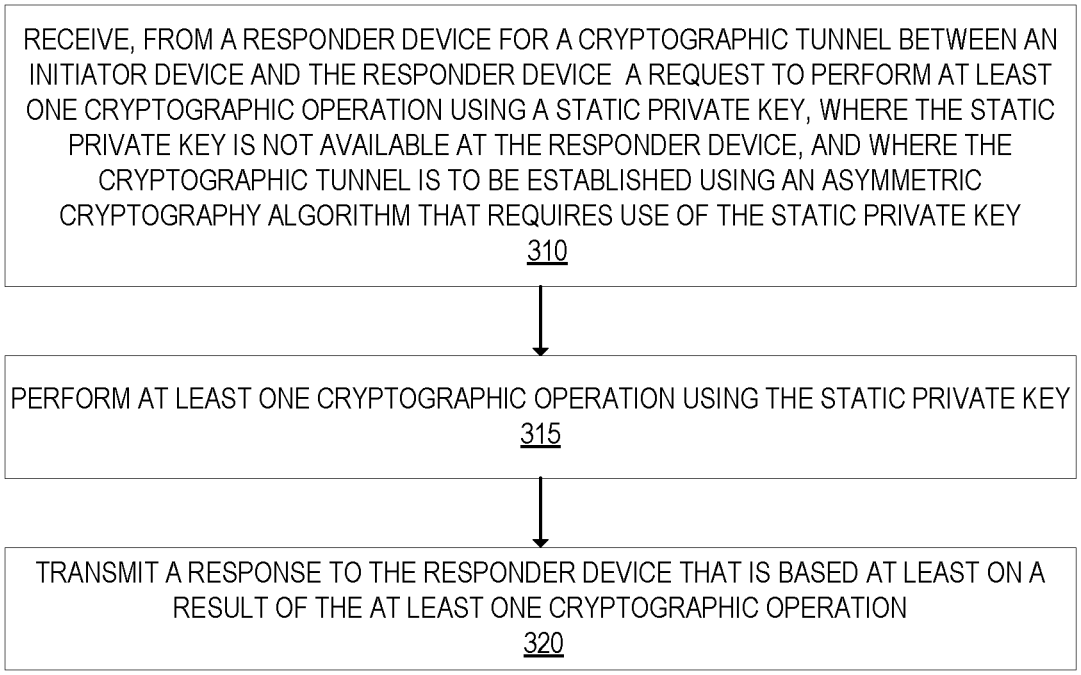
FIG. 3 is a flow diagram that illustrates exemplary operations for establishing a cryptographic tunnel between an initiator device and a responder device where the responder device does not have local access to a static private key used during the tunnel establishment, according to an embodiment.

FIGS. 2 and 3 are flow diagrams that illustrates exemplary operations for establishing a cryptographic tunnel between an initiator device and a responder device where the responder device does not have local access to a static private key used during the tunnel establishment, according to an embodiment. The operations of FIGS. 2 and 3 are described with respect to the exemplary embodiment of FIG. 1. However, the operations of FIGS. 2 and 3 can be performed by embodiments different than those of FIG. 1, and the embodiment of FIG. 1 can perform operations different than those of FIGS. 2 and 3. The operations of FIG. 2 are described from the perspective of the responder device 115. The operations of FIG. 3 are described from the perspective of the key server 120.

At operation 210, the responder device 115 receives from the initiator device 110, a request to initiate a cryptographic tunnel between the initiator device 110 and the responder device 115. Establishing the cryptographic tunnel includes use of an asymmetric cryptography algorithm that includes use of a static private key on the responder side. The responder device 115 does not include a static private key to be used in the asymmetric cryptography algorithm (e.g., the private key 125). Instead, the static private key is stored or available to the key server 120. In an embodiment, the request to initiate the cryptographic tunnel may be a handshake initiation message if the WireGuard® protocol is used.

The responder device 115 may perform at least one operation for responding to the request to initiate the cryptographic tunnel. In an embodiment, the responder device 115 performs each operation up until the point where the static private key is needed for performing one or more private key operations. In another embodiment, the tunnel application 117 performs less than each operation up until the point where the private key is required to perform one or more private key operations.

At operation 215, the responder device 115 transmits a request to a key server 120 that has access to the static private key 125 to be used in the asymmetric cryptography algorithm. The request in operation 215 is for the key server 120 to use the static private key 125 in at least one cryptographic operation of the asymmetric cryptography algorithm. The at least one cryptographic operation may be a Diffie-Hellman computation that affects at least the generation of the transport keys. The request may include information for the at least one cryptographic operation in which the key server 120 does not know (e.g., cannot locally derive). For instance, if the cryptographic operation is a Diffie-Hellman computation that uses the private key and other data that is generated for the handshake (e.g., an ephemeral public key of the initiator device 110), the request may include the other data for the handshake in which the key server 120 cannot independently derive.

Referring to FIG. 3, at operation 310, the key server 120 receives, from the responder device 115, the request to perform at least one cryptographic operation using a static private key. Next, at operation 315, the key server 120 performs at least one cryptographic operation using the static private key. In embodiment, the key server 120 performs at least two cryptographic operations using the private key (e.g., two Diffie-Hellman computations using the static private key 125). The key server 120 may perform one or more additional operations to the cryptographic operations including generating the transport keys for the tunnel application 117 to use when receiving and sending data over the cryptographic tunnel between the client network application 112 and the tunnel application 117.

Next, at operation 320, the key server 120 transmits a response to the responder device 115 that is based at least on a result of the at least one cryptographic operation. The response may include the direct value of the result of the private key operation and/or may include one or more values that are derived/computed using the result of the private key operation. In an embodiment, the response may include the transport keys for the responder device to use when receiving and sending data over the cryptographic tunnel between the client network application and the tunnel application.

Returning back to FIG. 2, at operation 220, the responder device 115 receives, from the key server 120, a response that is based on at least a result of the at least one cryptographic operation of the asymmetric cryptography algorithm using the static private key 125 (e.g., the response that was transmitted in operation 320). Next, at operation 225, the responder device 115 receives from the key server 120, or generates, a first set of one or more transport keys for the responder device 115 to use for sending and receiving data on the cryptographic tunnel. For example, the transport keys may include a key for encrypting data to be sent to the initiator device 110 and a key for decrypting data received from the initiator device 110.

The responder device 115 generates a response to the client request. The response includes information for the initiator device to generate a second set of one or more transport keys that it is to use for sending and receiving data on the cryptographic tunnel. At operation 230, the responder device 115 transmits the response to the initiator device 110. In an embodiment, the response may be a handshake response message if the WireGuard® protocol is used.

The initiator device 110 receives and processes the response including generating the second set of one or more transport keys for sending and receiving data on the cryptographic tunnel (e.g., a key for encrypting data to be sent to the responder device 115 and a key for decrypting data received from the responder device 115. At operation 235, the responder device 115 receives, from the initiator device 110, a first encrypted data packet over the cryptographic tunnel. The first encrypted data packet is encrypted with one of the second set of transport keys (e.g., the key to encrypt data to be sent to the responder device 115). Next, at operation 240, the responder device 115 decrypts the first encrypted data packet using at least one of the first set of one or more transport keys to reveal a first data packet. For example, the responder device 115 uses a key for decrypting data received from the initiator device 110 to decrypt the first encrypted data packet.

Next, at operation 245, the responder device 115 processes the first data packet. Processing the first data packet may take on many different forms depending on the type of packet. Assuming that the responder device 115 determines to reply to the initiator device 110 with a second data packet, at operation 250, the responder device 115 encrypts the second data packet using at least one of the first set of transport key(s). For example, the responder device 115 uses a key for encrypting data to be sent to the initiator device 110 to encrypt the second data packet. Next, at operation 255, the responder device 115 transmits the encrypted second data packet over the cryptographic tunnel to the initiator device 110.

Although FIG. 2 shows a particular order of operations performed in a certain embodiment, the order is exemplary and operations can be performed in a different order. For example, although FIG. 2 describes the responder device 115 receiving an encrypted data packet from the initiator device 110 over the cryptographic tunnel prior to the responder device 115 transmitting an encrypted data packet to the initiator device 110 over the cryptographic tunnel, the order of these operations can be switched. In other words, the responder device 115 may transmit an encrypted data packet over the cryptographic tunnel to the initiator device 110 before receiving an encrypted data packet over the cryptographic tunnel from the initiator device 110.

Figure 4A:
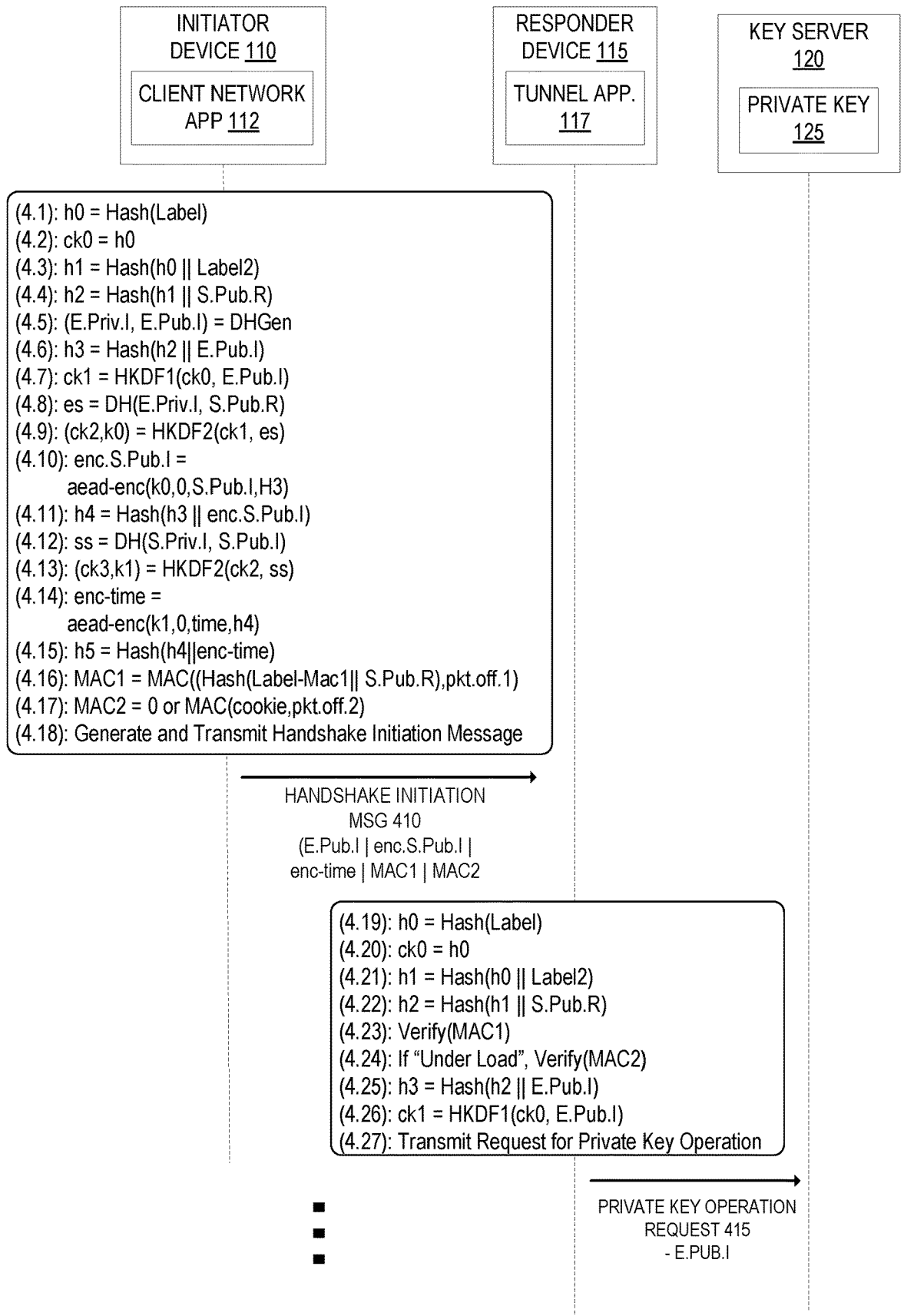
FIG. 4A illustrates a first portion of an exemplary sequence diagram establishing a cryptographic tunnel between an initiator device and a responder device where the responder device does not have local access to a static private key used during the tunnel establishment, according to an embodiment.
Figure 4B:
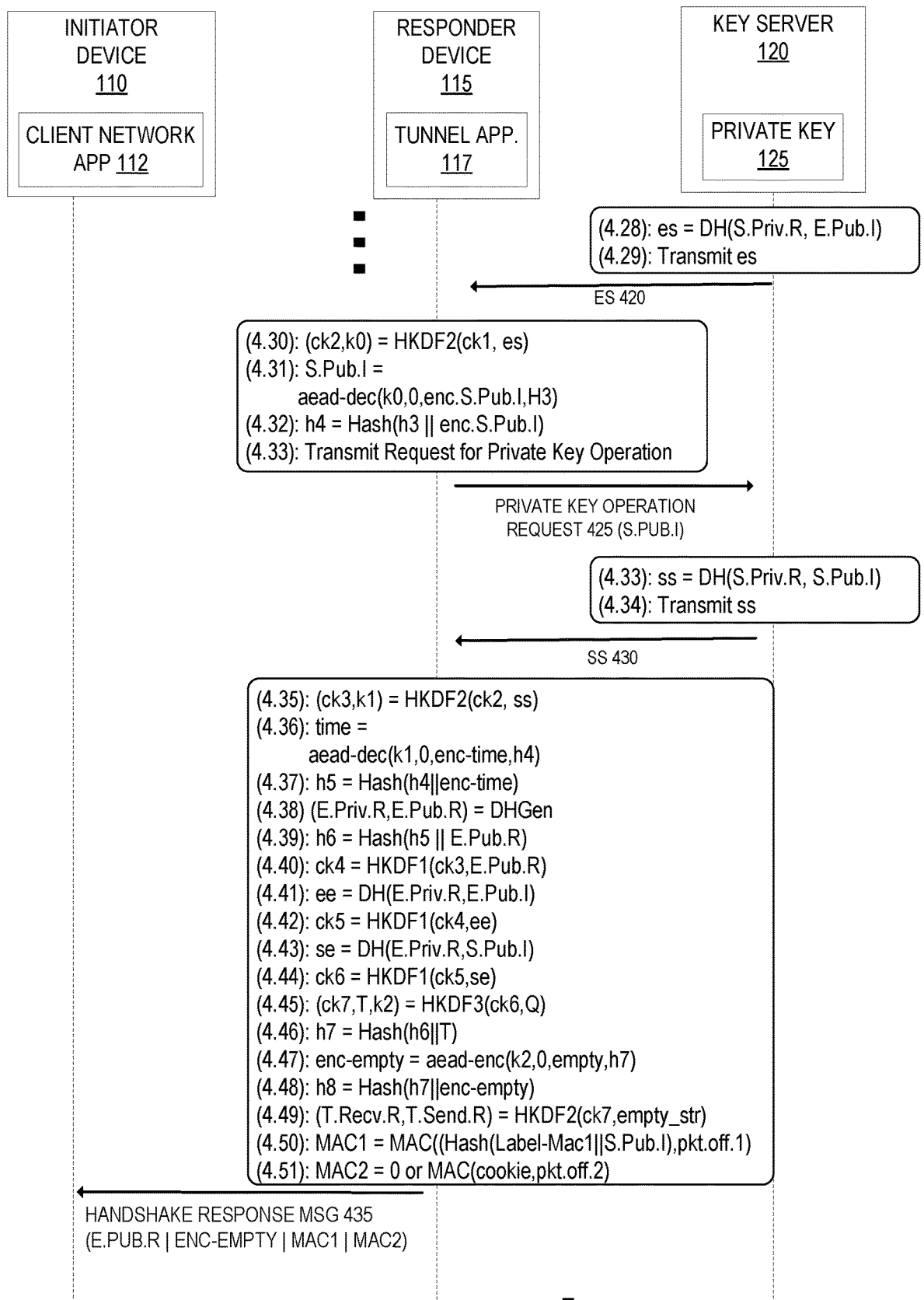
FIG. 4B illustrates a second portion of an exemplary sequence diagram establishing a cryptographic tunnel between an initiator device and a responder device where the responder device does not have local access to a static private key used during the tunnel establishment, according to an embodiment.
Figure 4C:
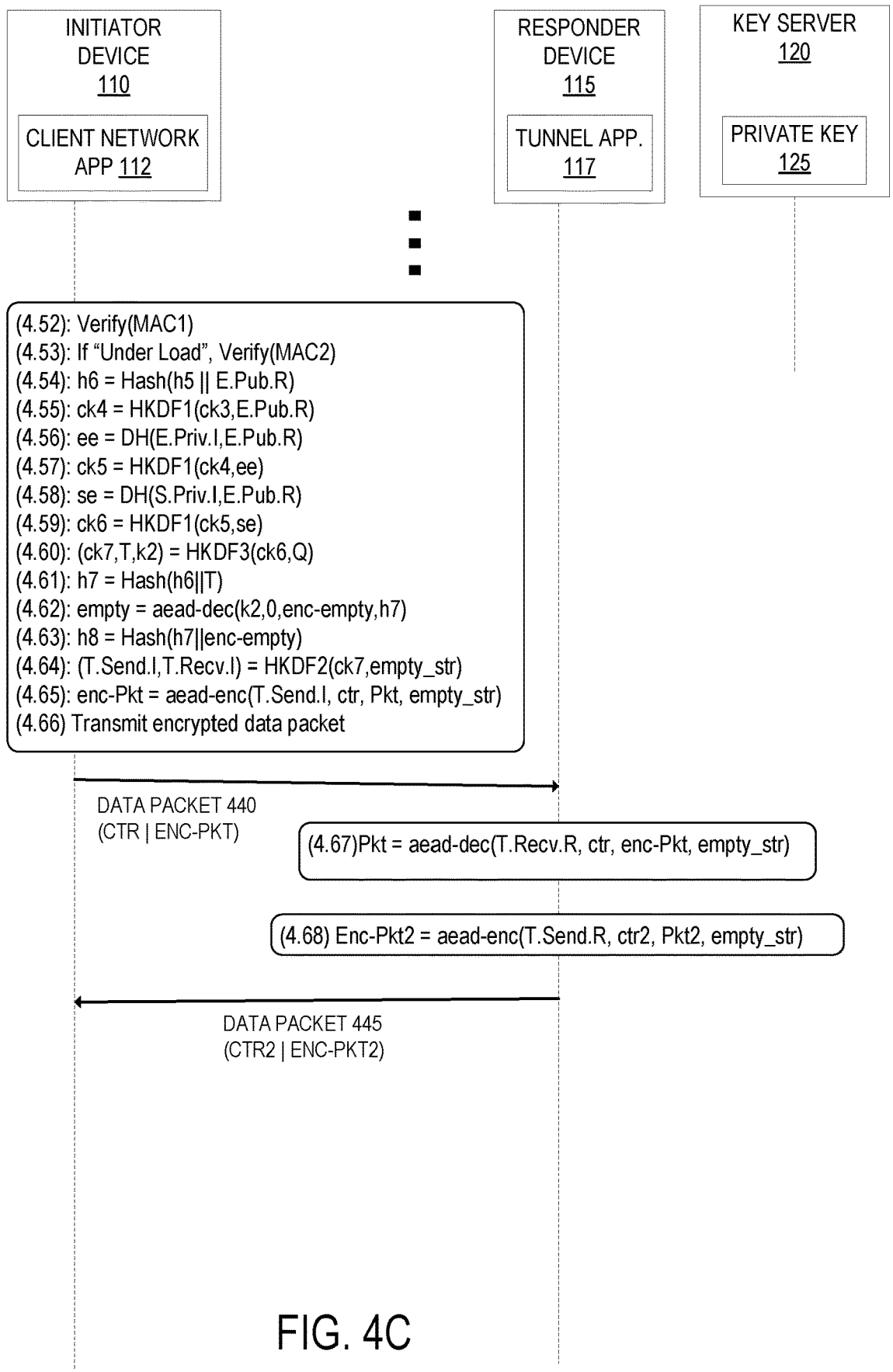
FIG. 4C illustrates a third portion of an exemplary sequence diagram establishing a cryptographic tunnel between an initiator device and a responder device where the responder device does not have local access to a static private key used during the tunnel establishment, according to an embodiment.

FIGS. 4A-4C illustrate an exemplary sequence diagram establishing a cryptographic tunnel between an initiator device and a responder device where the responder device does not have local access to a static private key used during the tunnel establishment, according to an embodiment. The operations of FIGS. 4A-4C are directed to the specific tunneling protocol WireGuard®. Similar operations may be performed for a different tunneling protocol.

The client network application 112 generates a handshake initiation message 410 according to the WireGuard® protocol. In an embodiment, this handshake initiation message 410 is unchanged from the WireGuard® protocol. At operation 4.1, the client network application 112 computes an initial handshake hash (h0) as a hash of a label (e.g., the protocol name). At operation 4.2, the client network application 112 sets the initial chaining key (ck0) as the initial handshake hash (h0). At operation 4.3, the client network application 112 computes a first handshake hash (h1) as the hash of the initial handshake hash (h0) concatenated with a second label (label 2). At operation 4.4, the client network application 112 computes a second handshake hash (h2) as the hash of the first handshake hash (h1) concatenated with the static public key of the tunnel application 117 (S.Pub.R) (the public key that corresponds with the private key 125). At operation 4.5, the client network application 112 generates an ephemeral private key (E.Priv.I) and an ephemeral public key (E.Pub.I). The ephemeral keys may be a Curve25519 private and public keys. The ephemeral keys may be used in a series of Diffie-Hellman computations. At operation 4.6, the client network application 112 computes a third handshake hash (h3) as the hash of the second handshake hash (h2) concatenated with the ephemeral public key of the client network application 112 (E.Pub.I). At operation 4.7, the client network application 112 computes a first chaining key (ck1) as the result of a 1-tuple HMAC-based Extract-and-Expand Key Derivation Function (HKDF) taking as input the initial chaining key (ck0) and the ephemeral public key of the client network application 112 (E.Pub.I). At operation 4.8, the client network application 112 computes a first shared secret (es) as the result of a Diffie-Hellman operation taking as input the ephemeral private key of the client network application 112 (E.Priv.I) and the static public key of the tunnel application 117 (S.Pub.R). At operation 4.9, the client network application 112 computes a second chaining key (ck2) and an initial handshake cipher key (k0) as the result of a 2-tuple HKDF taking as input the first chaining key (ck1) and the first shared secret (es). At operation 4.10, the client network application 112 encrypts the static public key of the client network application 112 using an authenticated encryption with associated data (AEAD) encryption algorithm, taking as input the initial handshake cipher key (k0), 0, the static public key of the client network application 112 (S.Pub.I), and the third handshake hash (h3). At operation 4.11, the client network application 112 computes a fourth handshake hash (h4) as the hash of the third handshake hash (h3) concatenated with the encrypted static public key of the client network application 112 (Enc.S.Pub.I). At operation 4.12, the client network application 112 computes a second shared secret (ss) as the result of a Diffie-Hellman operation taking as input the static private key of the client network application 112 (S.Priv.I) and the static public key of the client network application 112 (S.Pub.I). At operation 4.13, the client network application 112 computes a third chaining key (ck3) and a first handshake cipher key (k1) as the result of a 2-tuple HKDF taking as input the second chaining key (ck2) and the second shared secret (ss). At operation 4.14, the client network application 112 encrypts a timestamp as using an AEAD encryption algorithm taking as input the first handshake cipher key (k1), 0, the timestamp, and the fourth handshake hash (h4). At operation 4.15, the client network application 112 computes a fifth handshake hash (h5) as the hash of the fourth handshake hash (h4) concatenated with the encrypted-timestamp (enc-time). At operation 4.16, the client network application 112 computes a first message authentication code (MAC1) as a MAC of the hash value of the concatenation of a MAC label (Label-MAC1) and the static public key of the tunnel application 117, and all the bytes of the message prior to the MAC1 field (pkt.off.1) (including the data starting at the Type field and ending before the MAC1 field). At operation 4.17, the client network application 112 computes a second MAC (MAC2) as 0 or the MAC of the most recent cookie, if any, (within 120 seconds) received from the tunnel application 117 and all the bytes of the message prior to the MAC2 field (pkt.off.2). At operation 4.18, the client network application 4.18 generates and transmits the handshake initiation message 410. The handshake initiation message 410 includes the ephemeral public key of the client network application 112 (E.Pub.I), the encrypted static public key of the client network application 112 (Enc.S.Pub.I), the encrypted timestamp (enc-time), the first MAC (MAC1) and the second MAC (MAC2).

The tunnel application 117 receives the handshake initiation message 410. At operation 4.19, the tunnel application 117 computes an initial handshake hash (h0) as a hash of a label (e.g., the protocol name). At operation 4.20, the tunnel application 117 sets the initial chaining key (ck0) as the initial handshake hash (h0). At operation 4.21, the tunnel application 117 computes a first handshake hash (h1) as the hash of the initial handshake hash (h0) concatenated with a second label (label 2). At operation 4.22, the tunnel application 117 computes a second handshake hash (h2) as the hash of the first handshake hash (h1) concatenated with the static public key of the responder device 115 (the public key that corresponds with the private key 125). The operations 4.1-4.4 are the same as the operations 4.19-4.22. The operations 4.19-4.22 may be performed prior to the receipt of the handshake initiation message 410. At operation 4.23, the tunnel application 117 verifies the first MAC value included in the MAC1 field of the handshake initiation message 410. Verifying the first MAC value may include computing a MAC value as a MAC of the hash value of the concatenation of a MAC label (Label-MAC1) and the static public key of the tunnel application 117, and all the bytes of the message prior to the MAC1 field (pkt.off.1) (including the data starting at the Type field and ending before the MAC1 field); and comparing that value to the value in the MAC1 field. If it is not the same, then the tunnel application 117 may stop the handshake. If the values are the same, then the handshake continues. At operation 4.24, the tunnel application 117 determines if it is under load, and if so, verifies the second MAC value included in the MAC2 field of the handshake initiation message 410. If the under load condition is present, the tunnel application 117 may choose to not process the handshake message but instead respond with a cookie reply packet. If the responder device 115 is under load, in an embodiment it only accepts packet that additionally have a second MAC of the prior bytes of the message that utilize the cookie as the MAC key. The example of FIG. 4A assumes that the under load condition is not present or the MAC2 value is verified. At operation 4.25, the tunnel application 117 computes a third handshake hash (h3) as the hash of the second handshake hash (h2) concatenated with the ephemeral public key of the client network application 112 (E.Pub.I). At operation 4.26, the tunnel application 117 computes a first chaining key (ck1) as the result of a 1-tuple HKDF taking as input the initial chaining key (ck0) and the ephemeral public key of the client network application 112 (E.Pub.I).

The next operation in the handshake that would conventionally be performed by the tunnel application 117 using the static private key 125. However, the tunnel application 117 does not have local access to the static private key 125. Accordingly, at operation 4.27, the tunnel application 117 transmits a private key operation request 415 to the key server 120. The private key operation request 415 includes the ephemeral public key of the client network application 112.

Continuing at FIG. 4B, the key server 120 receives and processes the private key operation request 415. At operation 4.28, the key server 120 computes a first shared secret (es) as the result of a Diffie-Hellman operation taking as input the static private key 125 of the tunnel application 117 (S.Priv.R) and the ephemeral public key of the client network application 112. At operation 4.29, the key server 120 transmits a message 420 that includes the first shared secret (es) to the tunnel application 117.

At operation 4.30, the tunnel application 117 computes a second chaining key (ck2) and an initial handshake cipher key (k0) as the result of a 2-tuple HKDF taking as input the first chaining key (ck1) and the first shared secret (es). At operation 4.31, the tunnel application 117 decrypts the encrypted static public key of the client network application 112 using an AEAD decryption algorithm, taking as input the initial handshake cipher key (k0), 0, the encrypted static public key of the client network application 112 (Enc.S.Pub.I), and the third handshake hash (h3) to reveal the static public key of the client network application 112 (S.Pub.I). At operation 4.32, the tunnel application 117 computes a fourth handshake hash (h4) as the hash of the third handshake hash (h3) concatenated with the encrypted static public key of the client network application 112 (Enc.S.Pub.I).

The next operation in the handshake that would conventionally be performed by the tunnel application 117 using the static private key 125. However, the tunnel application 117 does not have local access to the static private key 125. Accordingly, at operation 4.33, the tunnel application 117 transmits a private key operation request 425 to the key server 120. The private key operation request 425 may include the static public key of the client network application 112. Alternatively, the key server 120 accesses the static public key of the client network application 112 through another source such as a public key repository.

The key server 120 receives and processes the private key operation request 425. At operation 4.33, the key server 120 computes a second shared secret (ss) as the result of a Diffie-Hellman operation taking as input the static private key 125 of the tunnel application 117 (S.Priv.R) and the static public key of the client network application 112 (S.Pub.I). At operation 4.34, the key server 120 transmits a message 430 that includes the second shared secret (ss) to the tunnel application 117.

The tunnel application 117 receives the second shared secret (ss) from the tunnel application 117 and now may perform the remaining operations of the tunnel handshake. At operation 4.35, the tunnel application 117 computes a third chaining key (ck3) and a first handshake cipher key (k1) as the result of a 2-tuple HKDF taking as input the second chaining key (ck2) and the second shared secret (ss). At operation 4.36, the tunnel application 117 decrypts the encrypted timestamp included in the handshake initiation message 410 using an AEAD decryption algorithm taking as input the first handshake cipher key (k1), 0, the encrypted timestamp, and the fourth handshake hash (h4). At operation 4.37, the tunnel application 117 computes a fifth handshake hash (h5) as the hash of the fourth handshake hash (h4) concatenated with the encrypted-timestamp (enc-time). At operation 4.38, the tunnel application 117 generates an ephemeral private key (E.Priv.R) and an ephemeral public key (E.Pub.R). The ephemeral keys may be a Curve25519 private and public keys. The ephemeral keys may be used in a series of Diffie-Hellman computations. At operation 4.39, the tunnel application 117 computes a sixth handshake hash (h6) as the hash of the fifth handshake hash (h5) concatenated with the ephemeral public key of the tunnel application 117 (E.Pub.R). At operation 4.40, the tunnel application 117 computes a fourth chaining key (ck4) as the result of a 1-tuple HKDF taking as input the third chaining key (ck3) and the ephemeral public key of the tunnel application 117 (E.Pub.R). At operation 4.41, the tunnel application 117 computes a third shared secret (ee) as the result of a Diffie-Hellman operation taking as input the ephemeral private key of the tunnel application 117 (E.Priv.R) and the ephemeral public key of the client network application 112 (E.Pub.I). At operation 4.42, the tunnel application 117 computes a fifth chaining key (ck5) as the result of a 1-tuple HKDF taking as input the fourth chaining key (ck4) and the third shared secret (ee). At operation 4.43, the tunnel application 117 computes a fourth shared secret (se) as the result of a Diffie-Hellman operation taking as input the ephemeral private key of the tunnel application 117 (E.Priv.R) and the static public key of the client network application 112 (S.Pub.I). At operation 4.44, the tunnel application 117 computes a sixth chaining key (ck6) as the result of a 1-tuple HKDF taking as input the fifth chaining key (ck5) and the fourth shared secret (se). At operation 4.45, the tunnel application 117 computes a seventh chaining key (ck7), a value T, and a second handshake cipher key (k2) as the result of a 3-tuple HKDF taking as input the sixth chaining key (ck6) and a pre-shared symmetric key (Q). At operation 4.46, the tunnel application 117 computes a seventh handshake hash (h7) as the hash of the sixth handshake hash (h6) concatenated with the value T. At operation 4.47, the tunnel application 117 encrypts an empty value using an AEAD encryption algorithm taking as input the second handshake cipher key (k2), 0, the empty value, and the seventh handshake hash (h7). At operation 4.48, the tunnel application 117 computes an eighth handshake hash (h8) as the hash of the seventh handshake hash (h7) concatenated with encrypted empty value (enc-empty). At operation 4.49, the tunnel application 117 computes a transport key for decrypting encrypted data received from the client network application 112 (T.Recv.R) and a transport key for encrypting data to be sent to the client network application 112 (T.Send.R) using a 2-tuple HKDF taking as input the seventh chaining key (ck7) and an empty string (empty_str). At operation 4.50, the tunnel application 117 computes a first MAC (MAC1) as the MAC of the hash value of the concatenation of a MAC label (Label-MAC1) and the static public key of the client network application 112 (S.Pub.I), and all the bytes of the message prior to the MAC1 field (pkt.off.1) (including the data starting at the Type field and ending before the MAC1 field). At operation 4.51, the tunnel application 117 computes a second MAC (MAC2) as 0 or the MAC of the most recent cookie, if any, (within 120 seconds) received from the client network application 112 and all the bytes of the message prior to the MAC2 field (pkt.off.2).

The tunnel application 117 generates and transmits a handshake response message 435 to the client network application 112. The handshake response message 435 includes the ephemeral public key of the tunnel application 117 (E.Pub.R), the encrypted empty (Enc-Empty), the first MAC, and the second MAC.

Continuing at FIG. 4C, the client network application 112 receives and processes the handshake response message 435. At operation 4.52, the client network application 112 verifies the first MAC value included in the MAC1 field of the handshake response message 435. Verifying the first MAC value may include computing a MAC value as a MAC of the hash value of the concatenation of a MAC label (Label-MAC1) and the static public key of the client network application 112, and all the bytes of the message prior to the MAC1 field (pkt.off.1) (including the data starting at the Type field and ending before the MAC1 field); and comparing that value to the value in the MAC1 field. If it is not the same, then the client network application 112 may stop the handshake. At operation 4.53, the client network application 112 determines if an under load condition exists, and if so, verifies the second MAC value included in the MAC2 field of the handshake response message 435. The example of FIG. 4A assumes that the under load condition is not present or the MAC2 value is verified. At operation 4.54, the client network application 112 computes a sixth handshake hash (h6) as the hash of the fifth handshake hash (h5) concatenated with the ephemeral public key of the tunnel application 117 (E.Pub.R). At operation 4.55, the client network application 112 computes a fourth chaining key (ck4) as the result of a 1-tuple HKDF taking as input the third chaining key (ck3) and the ephemeral public key of the tunnel application 117 (E.Pub.R). At operation 4.56, the client network application 112 computes a third shared secret (ee) as the result of a Diffie-Hellman operation taking as input the ephemeral private key of the client network application 112 (E.Priv.I) and the ephemeral public key of the tunnel application 117 (E.Pub.R). At operation 4.57, the client network application 112 computes a fifth chaining key (ck5) as the result of a 1-tuple HKDF taking as input the fourth chaining key (ck4) and the third shared secret (ee). At operation 4.58, the client network application 112 computes a fourth shared secret (se) as the result of a Diffie-Hellman operation taking as input the static private key of the client network application 112 (S.Priv.I) and the ephemeral public key of the tunnel application 117 (E.Pub.R). At operation 4.59, the client network application 112 computes a sixth chaining key (ck6) as the result of a 1-tuple HKDF taking as input the fifth chaining key (ck5) and the fourth shared secret (se). At operation 4.60, the client network application 112 computes a seventh chaining key (ck7), a value T, and a second handshake cipher key (k2) as the result of a 3-tuple HKDF taking as input the sixth chaining key (ck6) and a pre-shared symmetric key (Q). At operation 4.61, the client network application 112 computes a seventh handshake hash (h7) as the hash of the sixth handshake hash (h6) concatenated with the value T. At operation 4.62, the client network application 112 decrypts the encrypted empty value using an AEAD decryption algorithm taking as input the second handshake cipher key (k2), 0, the encrypted-empty value, and the seventh handshake hash (h7). At operation 4.63, the client network application 112 computes an eighth handshake hash (h8) as the hash of the seventh handshake hash (h7) concatenated with encrypted empty value (enc-empty). At operation 4.64, the client network application 112 computes a transport key for encrypting data to be sent to the tunnel application 117 (T.Send.I) and a transport key for decrypting encrypted data received from the tunnel application 117 (T.Recv.I) using a 2-tuple HKDF taking as input the seventh chaining key (ck7) and an empty string (empty_str).

At operation 4.65, the client network application 112 encrypts a packet payload using an AEAD encryption algorithm taking as input the transport key for encrypting data to be sent to the tunnel application 117 (T.Send.I), a counter (ctr), the packet to be encrypted (Pkt), and an empty string (empty_str). At operation 4.66, the client network application transmits the encrypted data packet 440 to the tunnel application 117. The encrypted data packet 440 includes the counter and the encrypted packet.

The tunnel application 117 receives and processes the encrypted data packet 440. At operation 4.67, the tunnel application 117 decrypts the encrypted packet (Enc-Pkt) included in the data packet 440 using an AEAD decryption algorithm taking as input the transport key for decrypting data received from the client network application 112 (T.Recv.R), the counter (ctr), the encrypted packet, and an empty string (empty_str). The responder device 115 processes the decrypted packet. Assuming that the responder device 115 determines to reply to the initiator device 110 with a second data packet, at operation 4.68, the tunnel application 117 encrypts the second data packet (Pkt2) using an AEAD encryption algorithm taking as input the transport key for encrypting data to be sent to the client network application 112 (T.Send.R), a second counter value (ctr2), the packet to be encrypted (Pkt2), and an empty string (empty_str). The tunnel application 117 transmits the encrypted data packet 445 to the client network application 112. The encrypted data packet 445 includes the second counter and the second encrypted packet. The client network application 112 receives the encrypted data packet 445 and can decrypt it using the transport key for decrypting data received from the tunnel application 117. Subsequent data messages between the client network application 112 and the tunnel application 117 use similar encryption and decryption.

Although FIG. 4C shows the client network application 112 transmitting an encrypted data packet 440 to the tunnel application 117 prior to the tunnel application 117 transmitting an encrypted data packet 445 to the client network application 112, the order of these packets may be switched. In other words, the tunnel application 117 may transmit an encrypted data packet over the established tunnel to the client network application 112 before the client network application 112 transmits an encrypted data packet over the established tunnel to the tunnel application 117.

Figure 5A:
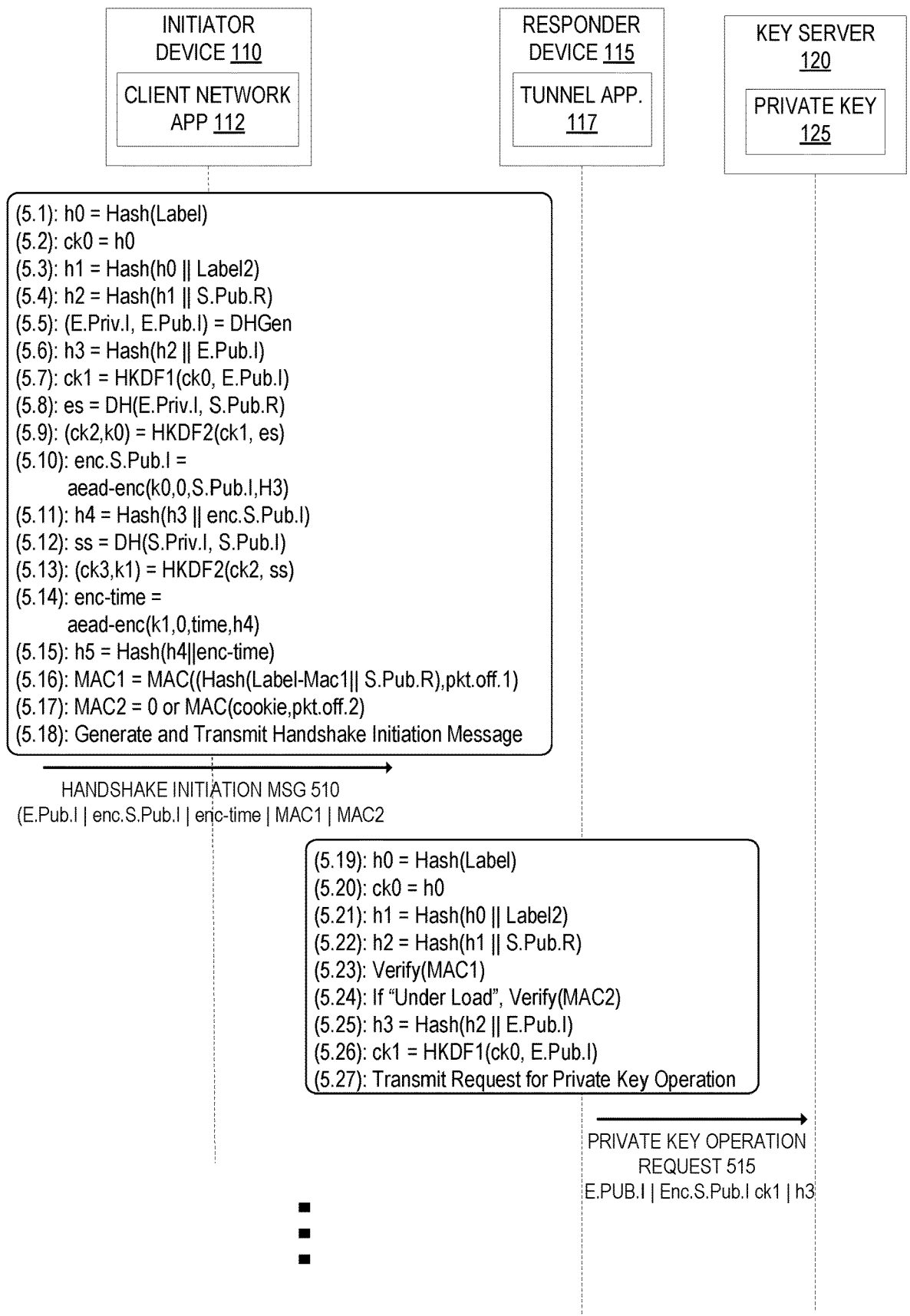
FIG. 5A illustrates a first portion of an exemplary sequence diagram establishing a cryptographic tunnel between an initiator device and a responder device where the responder device does not have local access to a static private key used during the tunnel establishment, according to an embodiment.
Figure 5B:
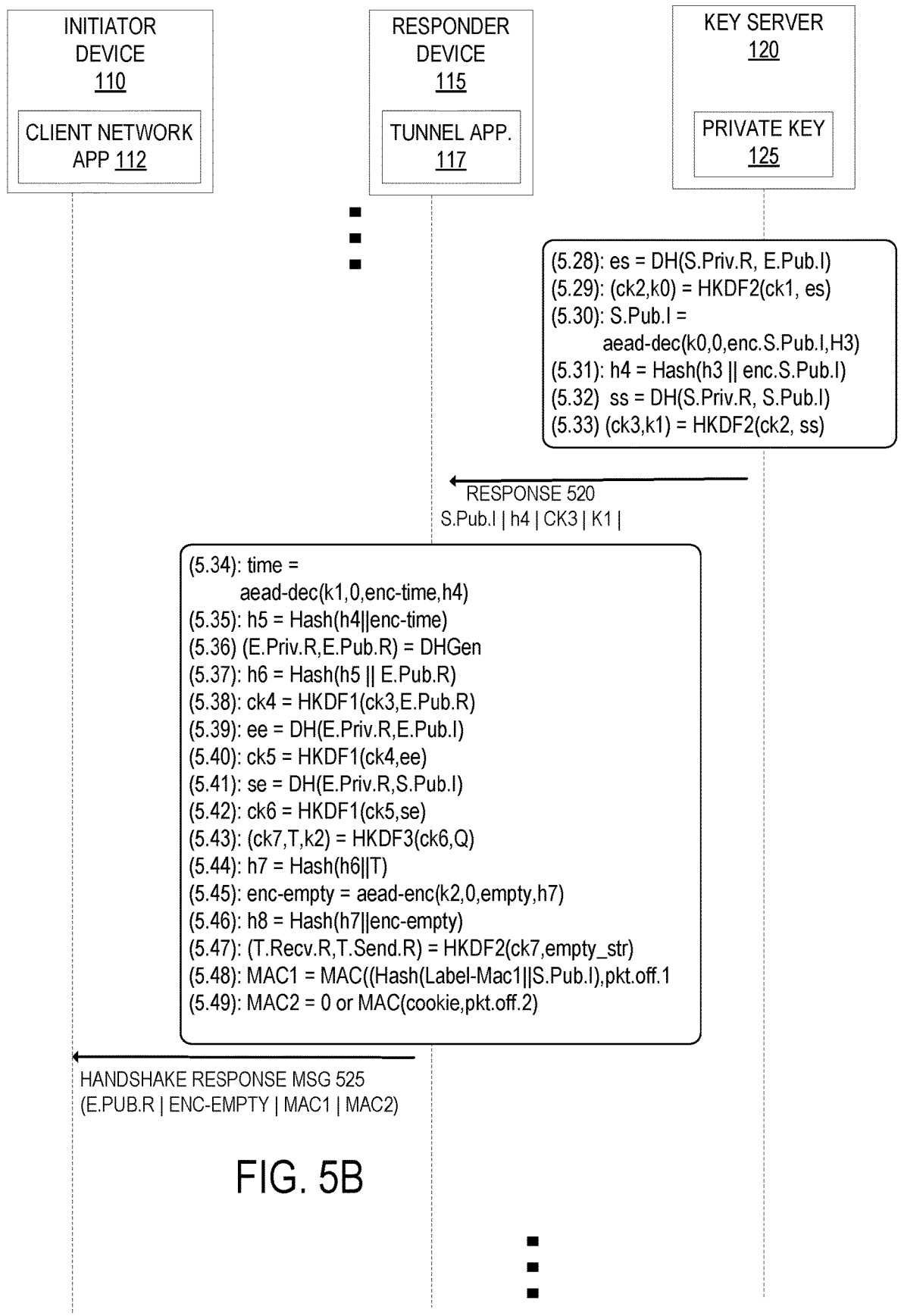
FIG. 5B illustrates a second portion of an exemplary sequence diagram establishing a cryptographic tunnel between an initiator device and a responder device where the responder device does not have local access to a static private key used during the tunnel establishment, according to an embodiment.
Figure 5C:
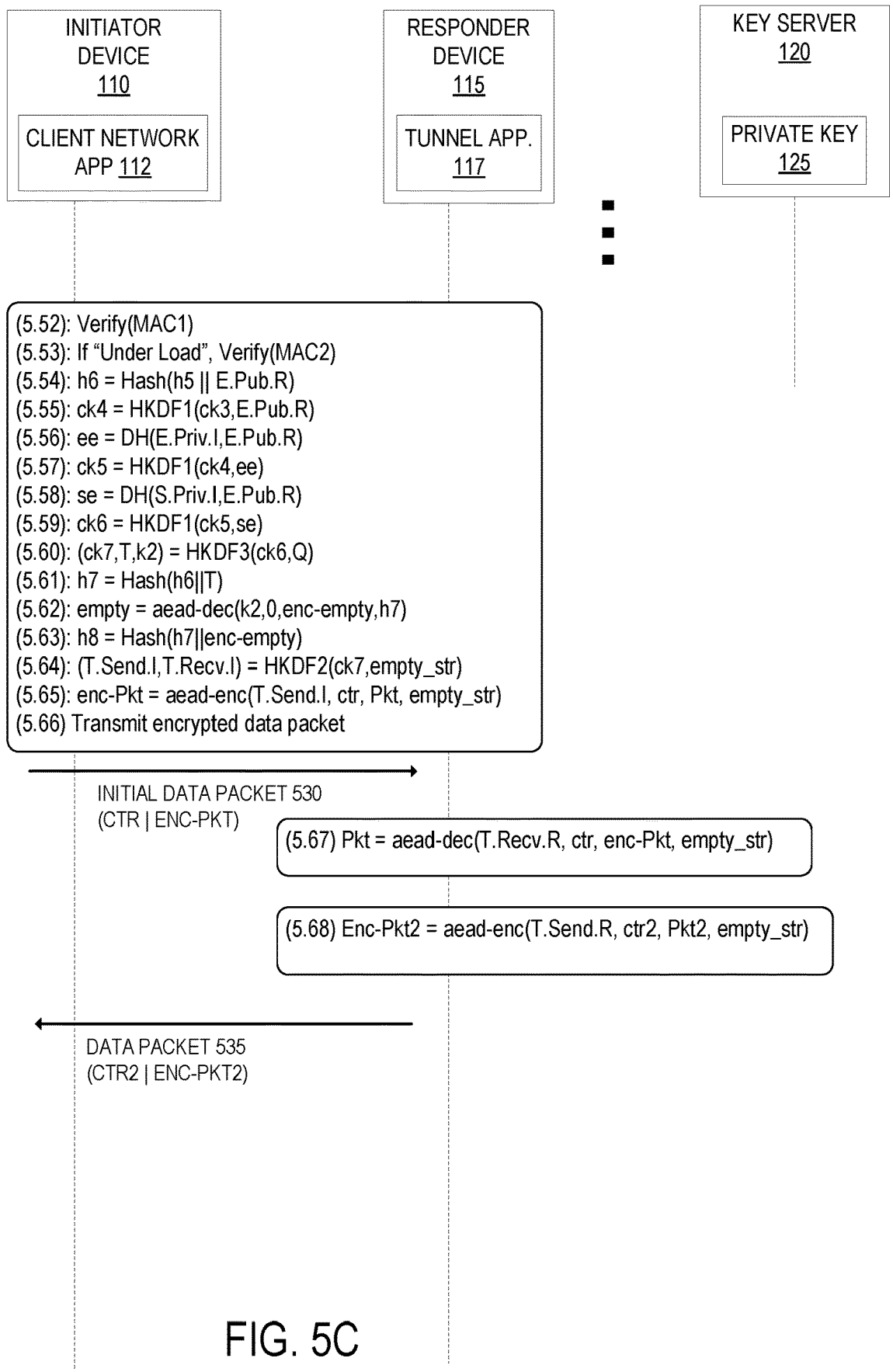
FIG. 5C illustrates a third portion of an exemplary sequence diagram establishing a cryptographic tunnel between an initiator device and a responder device where the responder device does not have local access to a static private key used during the tunnel establishment, according to an embodiment.

FIGS. 5A-5C illustrate an exemplary sequence diagram establishing a cryptographic tunnel between an initiator device and a responder device where the responder device does not have local access to a static private key used during the tunnel establishment, according to an embodiment. The operations of FIGS. 5A-5C are directed to the specific tunneling protocol WireGuard®. Similar operations may be performed for a different tunneling protocol. The operations of FIGS. 5A-5C are similar to the operations of FIGS. 4A-4C; however the embodiment shown in FIGS. 5A-5C has only one round trip to the key server 120.

The client network application 112 generates a handshake initiation message 510 according to the WireGuard® protocol. In an embodiment, this handshake initiation message 510 is unchanged from the WireGuard® protocol. The operations 5.1-5.18 are the same as the operations 4.1-4.18 and are not described herein again. The tunnel application 117 receives the handshake initiation message 510 and performs a number of operations to process the message including the operations 5.19-5.26, which are the same as the operations 4.19-4.26 and are not described herein again. The next operation in the handshake would conventionally be performed by the tunnel application 117 using the static private key 125. However, the tunnel application 117 does not have local access to the static private key 125. Accordingly, at operation 5.27, the tunnel application 117 transmits a private key operation request 515 to the key server 120. The private key operation request 515 includes the ephemeral public key of the client network application 112 (E.Pub.I), the encrypted static public key of the client network application 112 (Enc.S.Pub.I), the first chaining key (ck1), and the third handshake hash (h3).

Continuing at FIG. 5B, the key server 120 receives and processes the private key operation request 515. At operation 5.28, the key server 120 computes a first shared secret (es) as the result of a Diffie-Hellman operation taking as input the static private key 125 of the tunnel application 117 (S.Priv.R) and the ephemeral public key of the client network application 112 (E.Pub.I). At operation 5.29, the key server 120 computes a second chaining key (ck2) and an initial handshake cipher key (k0) as the result of a 2-tuple HKDF taking as input the first chaining key (ck1) and the first shared secret (es). At operation 5.30, the key server 120 decrypts the encrypted static public key of the client network application 112 using an AEAD decryption algorithm, taking as input the initial handshake cipher key (k0), 0, the encrypted static public key of the client network application 112 (Enc.S.Pub.I), and the third handshake hash (h3) to reveal the static public key of the client network application 112 (S.Pub.I). At operation 5.31, the key server 120 computes a fourth handshake hash (h4) as the hash of the third handshake hash (h3) concatenated with the encrypted static public key of the client network application 112 (Enc.S.Pub.I). At operation 5.32, the key server 120 computes a second shared secret (ss) as the result of a Diffie-Hellman operation taking as input the static private key 125 of the tunnel application 117 (S.Priv.R) and the static public key of the client network application 112 (S.Pub.I). At operation 5.33, the key server 120 computes a third chaining key (ck3) and a first handshake cipher key (k1) as the result of a 2-tuple HKDF taking as input the second chaining key (ck2) and the second shared secret (ss).

The key server 120 transmits a response 520 to the tunnel application 117 that includes the static public key of the client network application 112 (S.Pub.I), the fourth handshake hash (h4), the third chaining key (ck3), and the first handshake cipher key (k1). The tunnel application 117 receives the response 520 from the key server 120 and now may perform the remaining operations of the tunnel handshake beginning at operation 5.34. The remaining operations (5.34-5.49 are the same as the operations 4.36-4.51 and will not be described again herein. The tunnel application 117 transmits a handshake response message 525 to the client network application 112. The handshake response message 525 takes the same form as the handshake response message 435 and includes the ephemeral public key of the tunnel application 117 (E.Pub.R), the encrypted empty (Enc-Empty), the first MAC, and the second MAC. Referring to FIG. 5C, the operations 5.52-5.66 performed by the client network application 112 are the same as the operations 4.52-4.66 and are not described herein again. The initial data packet 530 takes the same format as the initial data packet 440 and will not be described again. The tunnel application performs the operations 5.67 and 5.68, which are the same as the operations 4.67 and 4.68. Also, the data packet 535 takes the same format as the data packet 445.

Although FIG. 5C shows the client network application 112 transmitting an encrypted data packet 530 to the tunnel application 117 prior to the tunnel application 117 transmitting an encrypted data packet 535 to the client network application 112, the order of these packets may be switched. In other words, the tunnel application 117 may transmit an encrypted data packet over the established tunnel to the client network application 112 before the client network application 112 transmits an encrypted data packet over the established tunnel to the tunnel application 117.

Figure 6A:
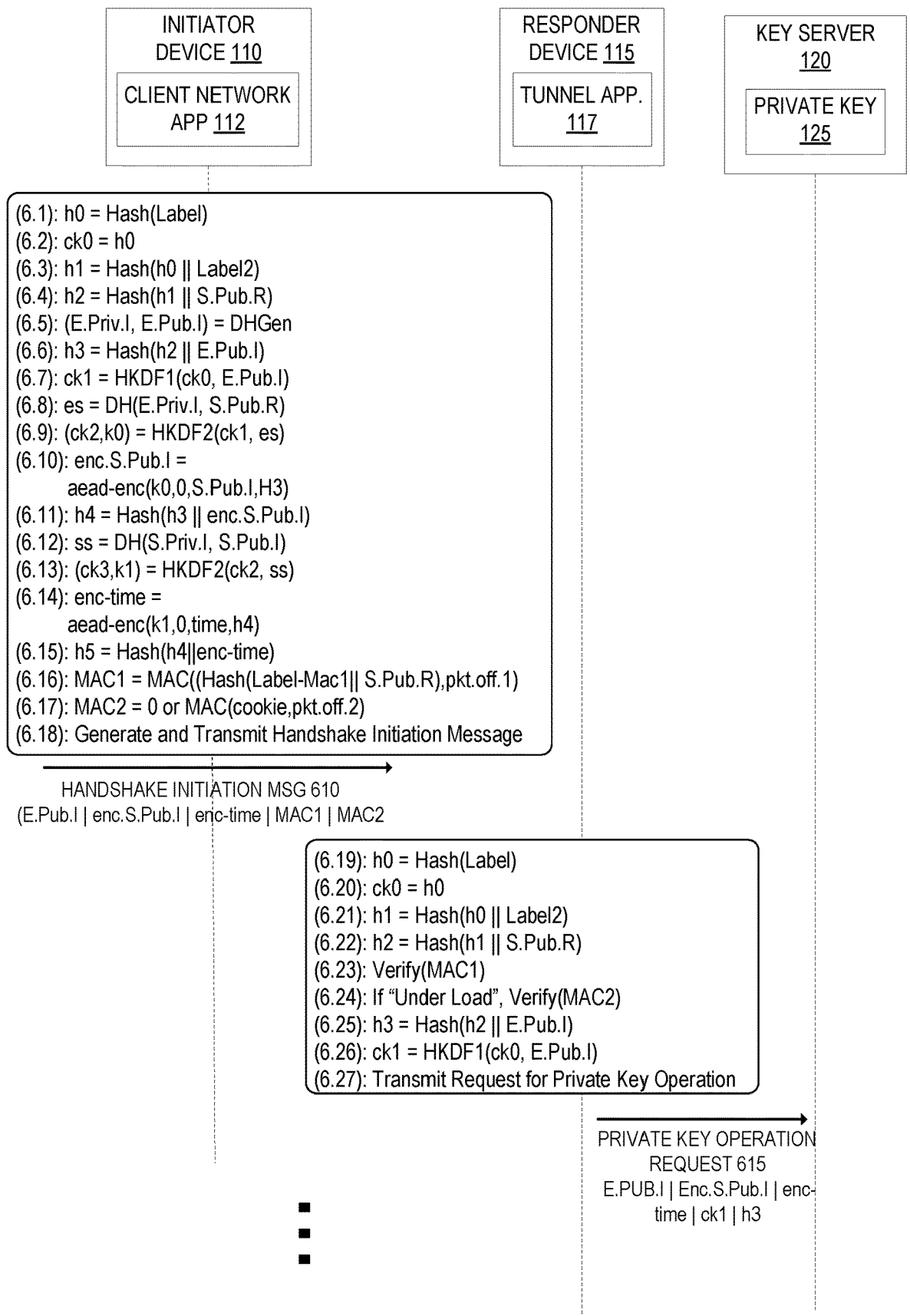
FIG. 6A illustrates a first portion of an exemplary sequence diagram establishing a cryptographic tunnel between an initiator device and a responder device where the responder device does not have local access to a static private key used during the tunnel establishment, according to an embodiment.
Figure 6B:
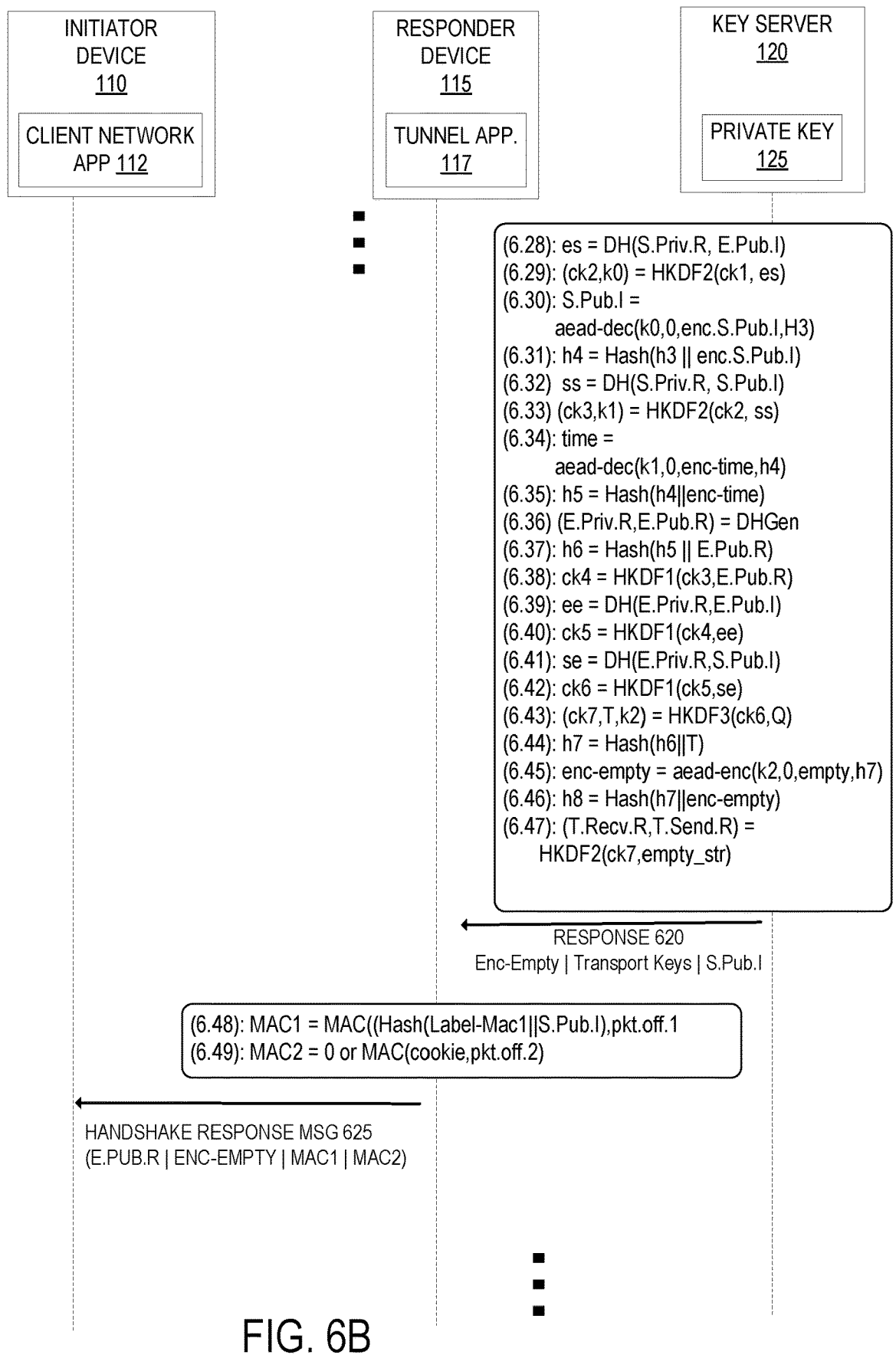
FIG. 6B illustrates a second portion of an exemplary sequence diagram establishing a cryptographic tunnel between an initiator device and a responder device where the responder device does not have local access to a static private key used during the tunnel establishment, according to an embodiment.
Figure 6C:
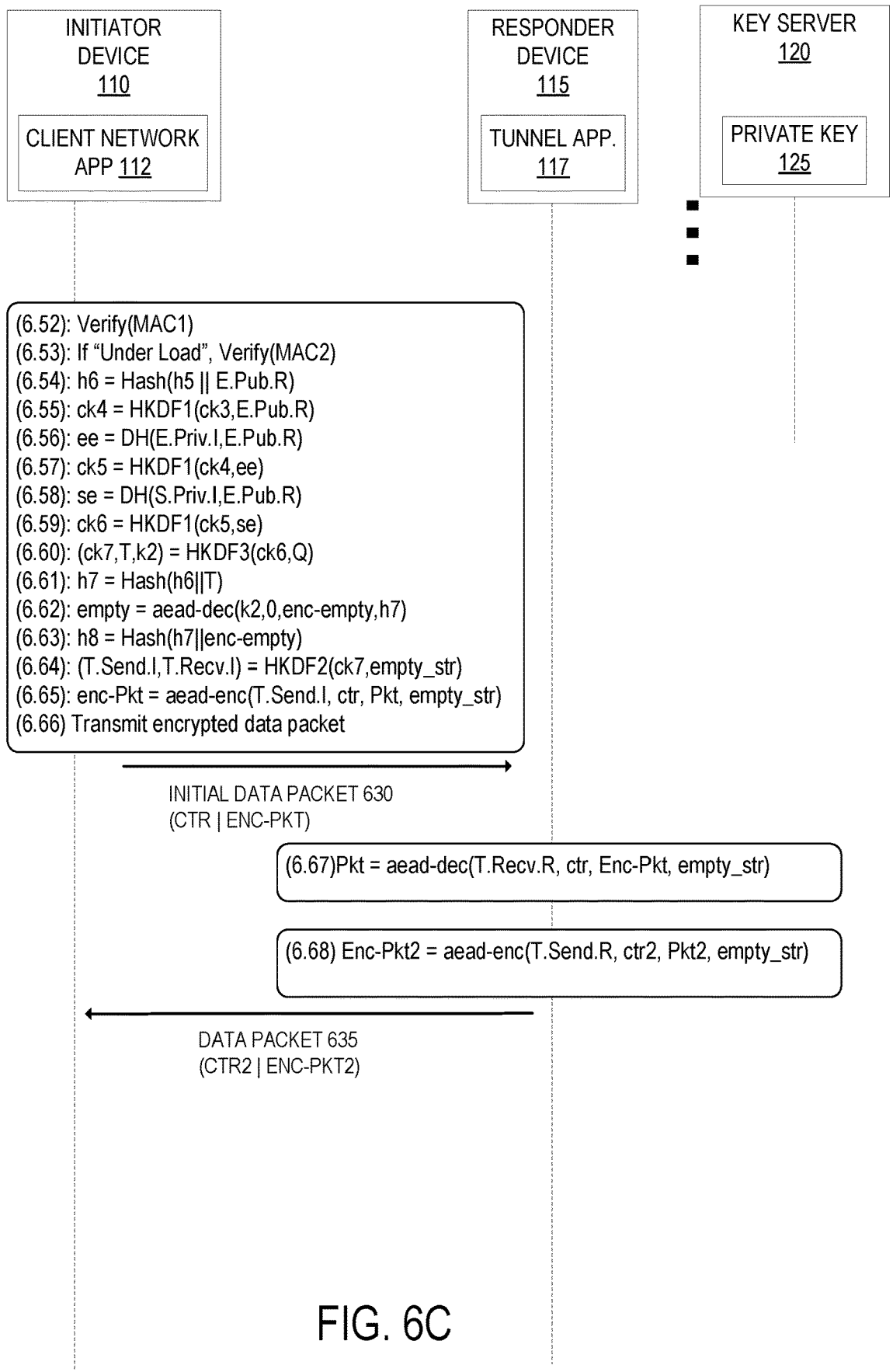
FIG. 6C illustrates a third portion of an exemplary sequence diagram establishing a cryptographic tunnel between an initiator device and a responder device where the responder device does not have local access to a static private key used during the tunnel establishment, according to an embodiment.

FIGS. 6A-6C illustrate an exemplary sequence diagram establishing a cryptographic tunnel between an initiator device and a responder device where the responder device does not have local access to a static private key used during the tunnel establishment, according to an embodiment. The operations of FIGS. 6A-6C are directed to the specific tunneling protocol WireGuard®. Similar operations may be performed for a different tunneling protocol. The operations of FIGS. 6A-6C are similar to the operations of FIGS. 5A-5C; however the embodiment shown in FIGS. 6A-6C has the key server 120 computing the transport keys on behalf of the tunnel application 117.

The client network application 112 generates a handshake initiation message 610 according to the WireGuard® protocol. In an embodiment, this handshake initiation message 610 is unchanged from the WireGuard® protocol. The operations 6.1-6.18 are the same as the operations 4.1-4.18 and are not described herein again. The tunnel application 117 receives the handshake initiation message 610 and performs a number of operations to process the message including the operations 6.19-6.26, which are the same as the operations 4.19-4.26 and are not described herein again. The next operation in the handshake would conventionally be performed by the tunnel application 117 using the static private key 125. However, the tunnel application 117 does not have local access to the static private key 125. Accordingly, at operation 6.27, the tunnel application 117 transmits a private key operation request 615 to the key server 120. The private key operation request 615 includes the ephemeral public key of the client network application 112 (E.Pub.I), the encrypted static public key of the client network application 112 (Enc.S.Pub.I), the encoded timestamp (enc-time), the first chaining key (ck1) and the third handshake hash (h3).

Continuing at FIG. 6B, the key server 120 receives and processes the private key operation request 615. At operation 6.28, the key server 120 computes a first shared secret (es) as the result of a Diffie-Hellman operation taking as input the static private key 125 of the tunnel application 117 (S.Priv.R) and the ephemeral public key of the client network application 112 (E.Pub.I). At operation 6.29, the key server 120 computes a second chaining key (ck2) and an initial handshake cipher key (k0) as the result of a 2-tuple HKDF taking as input the first chaining key (ck1) and the first shared secret (es). At operation 6.30, the key server 120 decrypts the encrypted static public key of the client network application 112 using an AEAD decryption algorithm, taking as input the initial handshake cipher key (k0), 0, the encrypted static public key of the client network application 112 (Enc.S.Pub.I), and the third handshake hash (h3) to reveal the static public key of the client network application 112 (S.Pub.I). At operation 6.31, the key server 120 computes a fourth handshake hash (h4) as the hash of the third handshake hash (h3) concatenated with the encrypted static public key of the client network application 112 (Enc.S.Pub.I). At operation 6.32, the key server 120 computes a second shared secret (ss) as the result of a Diffie-Hellman operation taking as input the static private key 125 of the tunnel application 117 (S.Priv.R) and the static public key of the client network application 112 (S.Pub.I). At operation 6.33, the key server 120 computes a third chaining key (ck3) and a first handshake cipher key (k1) as the result of a 2-tuple HKDF taking as input the second chaining key (ck2) and the second shared secret (ss). At operation 6.34, the key server 120 decrypts the encrypted timestamp included in the handshake initiation message 610 using an AEAD decryption algorithm taking as input the first handshake cipher key (k1), 0, the encrypted timestamp, and the fourth handshake hash (h4). At operation 6.35, the key server 120 computes a fifth handshake hash (h5) as the hash of the fourth handshake hash (h4) concatenated with the encrypted-timestamp (enc-time). At operation 6.36, the key server 120 generates an ephemeral private key (E.Priv.R) and an ephemeral public key (E.Pub.R). The ephemeral keys may be a Curve25519 private and public keys. The ephemeral keys may be used in a series of Diffie-Hellman computations. At operation 6.37, the key server 120 computes a sixth handshake hash (h6) as the hash of the fifth handshake hash (h5) concatenated with the ephemeral public key of the tunnel application 117 (E.Pub.R). At operation 6.38, the key server 120 computes a fourth chaining key (ck4) as the result of a 1-tuple HKDF taking as input the third chaining key (ck3) and the ephemeral public key of the tunnel application 117 (E.Pub.R). At operation 6.39, the key server 120 computes a third shared secret (ee) as the result of a Diffie-Hellman operation taking as input the ephemeral private key of the tunnel application 117 (E.Priv.R) and the ephemeral public key of the client network application 112 (E.Pub.I). At operation 6.40, the key server 120 computes a fifth chaining key (ck5) as the result of a 1-tuple HKDF taking as input the fourth chaining key (ck4) and the third shared secret (ee). At operation 6.41, the key server 120 computes a fourth shared secret (se) as the result of a Diffie-Hellman operation taking as input the ephemeral private key of the tunnel application 117 (E.Priv.R) and the static public key of the client network application 112 (S.Pub.I). At operation 6.42, the key server 120 computes a sixth chaining key (ck6) as the result of a 1-tuple HKDF taking as input the fifth chaining key (ck5) and the fourth shared secret (se). At operation 6.43, the key server 120 computes a seventh chaining key (ck7), a value T, and a second handshake cipher key (k2) as the result of a 3-tuple HKDF taking as input the sixth chaining key (ck6) and a pre-shared symmetric key (Q). At operation 6.44, the key server 120 computes a seventh handshake hash (h7) as the hash of the sixth handshake hash (h6) concatenated with the value T. At operation 6.45, the key server 120 encrypts an empty value using an AEAD encryption algorithm taking as input the second handshake cipher key (k2), 0, the empty value, and the seventh handshake hash (h7). At operation 6.46, the key server 120 computes an eighth handshake hash (h8) as the hash of the seventh handshake hash (h7) concatenated with encrypted empty value (enc-empty). At operation 6.47, the key server 120 computes a transport key for decrypting encrypted data received from the client network application 112 (T.Recv.R) and a transport key for encrypting data to be sent to the client network application 112 (T.Send.R) using a 2-tuple HKDF taking as input the seventh chaining key (ck7) and an empty string (empty_str).

The key server 120 transmits a response 620 to the tunnel application 117 that includes the static public key of the client network application 112 (S.Pub.I), the encrypted-empty value (Enc-Empty), and the transport keys. The tunnel application 117 receives the response 620 from the key server 120 and may perform the operations 6.48 and 6.49 to generate the first MAC and second MAC. Alternatively, the key server 120 may generate the first MAC and/or the second MAC and send the generated values in the response to the tunnel application 117.

The tunnel application 117 transmits a handshake response message 625 to the client network application 112. The handshake response message 625 takes the same form as the handshake response message 435 and includes the ephemeral public key of the tunnel application 117 (E.Pub.R), the encrypted empty (Enc-Empty), the first MAC, and the second MAC. Referring to FIG. 6C, the operations 6.52-6.66 performed by the client network application 112 are the same as the operations 4.52-4.66 and are not described herein again. The initial data packet 630 takes the same format as the initial data packet 440 and will not be described again. The tunnel application performs the operations 6.67 and 6.68, which are the same as the operations 4.67 and 4.68. Also, the data packet 635 takes the same format as the data packet 445.

Although FIG. 6C shows the client network application 112 transmitting an encrypted data packet 630 to the tunnel application 117 prior to the tunnel application 117 transmitting an encrypted data packet 635 to the client network application 112, the order of these packets may be switched. In other words, the tunnel application 117 may transmit an encrypted data packet over the established tunnel to the client network application 112 before the client network application 112 transmits an encrypted data packet over the established tunnel to the tunnel application 117.

Figure 7A:
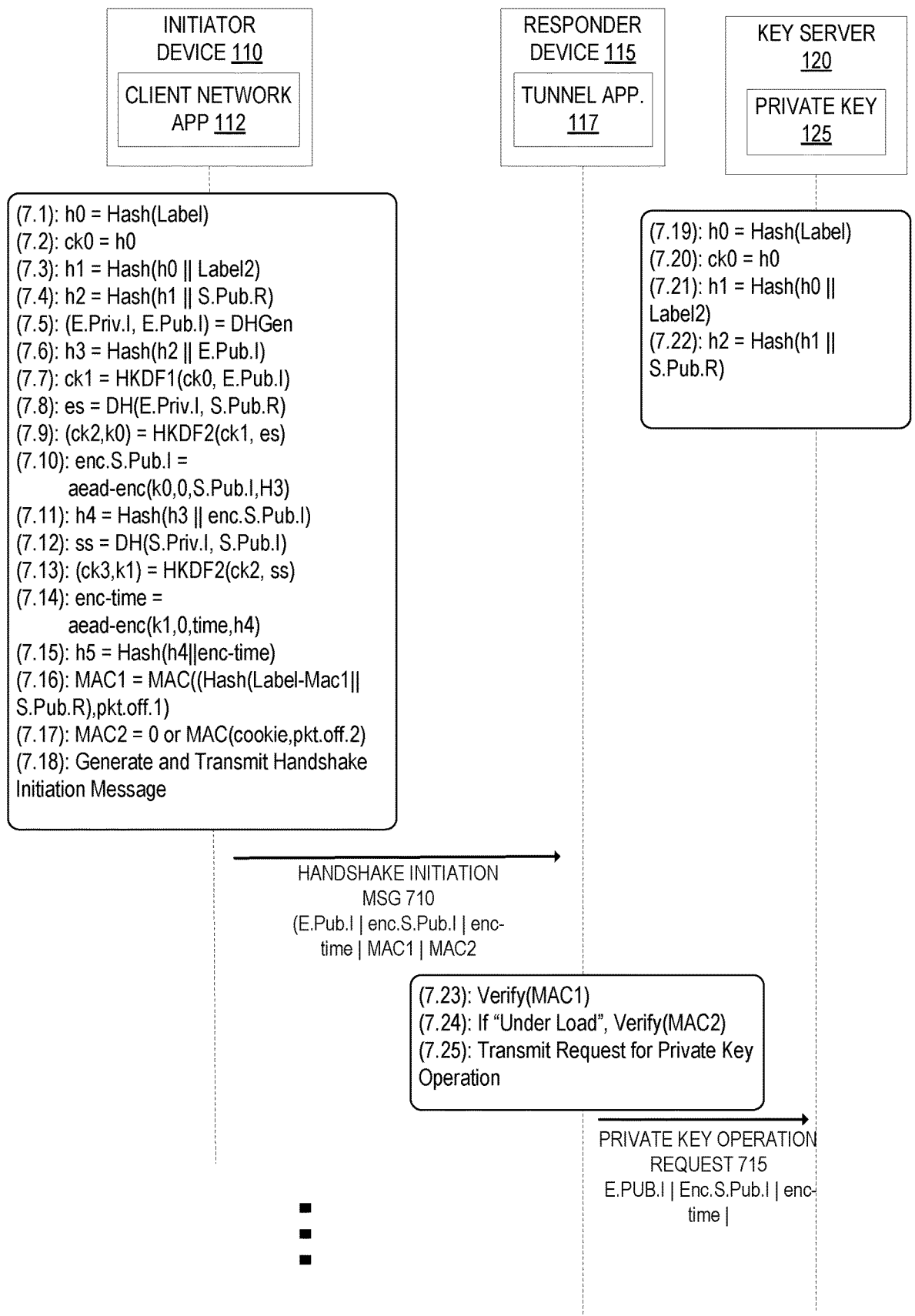
FIG. 7A illustrates a first portion of an exemplary sequence diagram establishing a cryptographic tunnel between an initiator device and a responder device where the responder device does not have local access to a static private key used during the tunnel establishment, according to an embodiment.
Figure 7B:
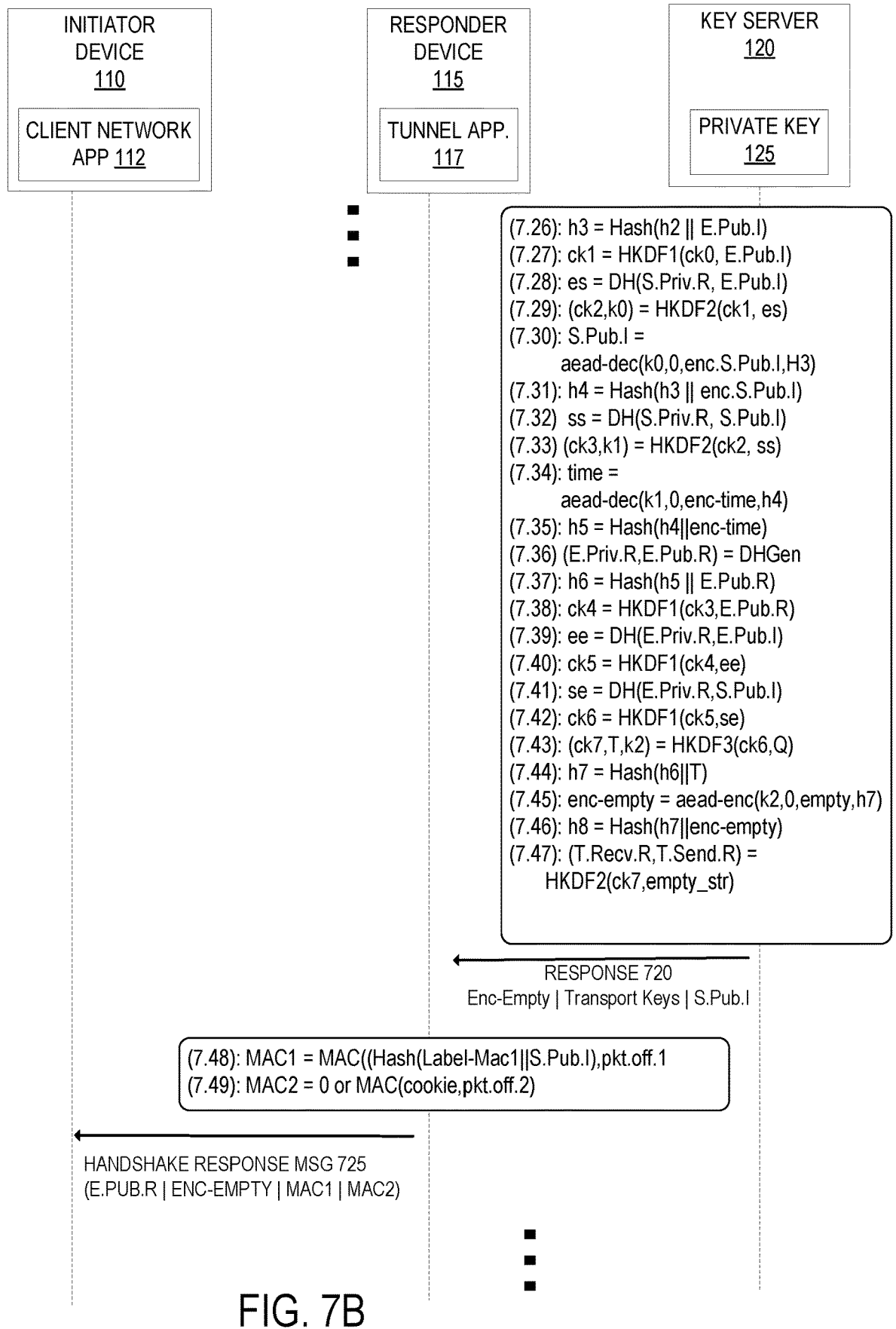
FIG. 7B illustrates a second portion of an exemplary sequence diagram establishing a cryptographic tunnel between an initiator device and a responder device where the responder device does not have local access to a static private key used during the tunnel establishment, according to an embodiment.
Figure 7C:
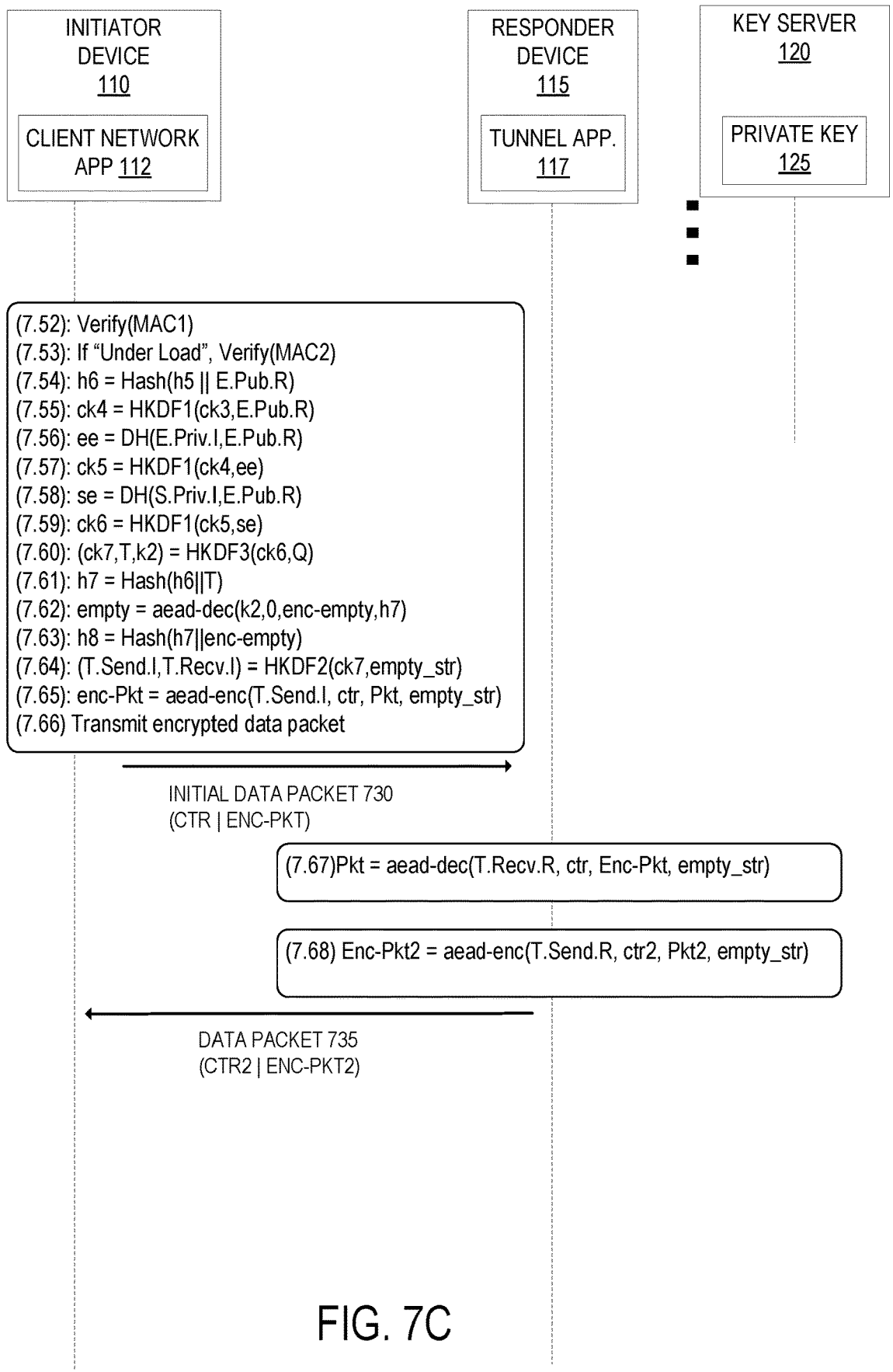
FIG. 7C illustrates a third portion of an exemplary sequence diagram establishing a cryptographic tunnel between an initiator device and a responder device where the responder device does not have local access to a static private key used during the tunnel establishment, according to an embodiment.

FIGS. 7A-7C illustrate an exemplary sequence diagram establishing a cryptographic tunnel between an initiator device and a responder device where the responder device does not have local access to a static private key used during the tunnel establishment, according to an embodiment. The operations of FIGS. 7A-7C are directed to the specific tunneling protocol WireGuard®. Similar operations may be performed for a different tunneling protocol. The operations of FIGS. 7A-7C are similar to the operations of FIGS. 6A-6C; however the embodiment shown in FIGS. 7A-7C has the key server 120 performing more operations on behalf of the tunnel application 117 than in FIGS. 6A-6C.

The client network application 112 generates a handshake initiation message 710 according to the WireGuard® protocol. In an embodiment, this handshake initiation message 710 is unchanged from the WireGuard® protocol. The operations 7.1-7.18 are the same as the operations 4.1-4.18 and are not described herein again. The tunnel application 117 receives the handshake initiation message 710. At some time, the key server 120 computes an initial handshake hash (h0) as a hash of a label (e.g., the protocol name) at operation 7.19. At operation 7.20, the key server 120 sets the initial chaining key (ck0) as the initial handshake hash (h0). At operation 7.21, the key server 120 computes a first handshake hash (h1) as the hash of the initial handshake hash (h0) concatenated with a second label (label 2). At operation 7.22, the key server 120 computes a second handshake hash (h2) as the hash of the first handshake hash (h1) concatenated with the static public key of the responder device 115 (the public key that corresponds with the private key 125). The operations 7.19-7.22 may be performed prior to the receipt of the handshake initiation message 710, or could be performed after the tunnel application 117 transmits a request for a private key operation.

Referring back to the tunnel application 117, it verifies the first MAC value included in the MAC1 field of the handshake initiation message 710 at operation 7.23. Verifying the first MAC value may include computing a MAC value as a MAC of the hash value of the concatenation of a MAC label (Label-MAC1) and the static public key of the tunnel application 117, and all the bytes of the message prior to the MAC1 field (pkt.off.1) (including the data starting at the Type field and ending before the MAC1 field); and comparing that value to the value in the MAC1 field. If it is not the same, then the tunnel application 117 may stop the handshake. If the values are the same, then the handshake continues. At operation 7.24, the tunnel application 117 determines if it is under load, and if so, verifies the second MAC value included in the MAC2 field of the handshake initiation message 710. If the under load condition is present, the tunnel application 117 may choose to not process the handshake message but instead respond with a cookie reply packet. If the responder device 115 is under load, in an embodiment it only accepts packet that additionally have a second MAC of the prior bytes of the message that utilize the cookie as the MAC key. The example of FIG. 7A assumes that the under load condition is not present or the MAC2 value is verified. The next operation in the handshake would conventionally be performed by the tunnel application 117 using the static private key 125. However, the tunnel application 117 does not have local access to the static private key 125. Accordingly, at operation 7.25, the tunnel application 117 transmits a private key operation request 715 to the key server 120. The private key operation request 715 includes the ephemeral public key of the client network application 112 (E.Pub.I), the encrypted static public key of the client network application 112 (Enc.S.Pub.I), and the encoded timestamp (enc-time). Since in this embodiment the key server 120 computes the initial chaining key (ck0), the key server 120 can compute the first chaining key (ck1). Accordingly, the first chaining key (ck1) does not need to be included in the private key operation request 715. Also, since in this embodiment the key server 120 computes the second handshake hash (h2), the key server 120 can compute the third handshake hash (h3). Accordingly, the third handshake hash (h3) does not need to be included in the private key operation request 715.

Continuing at FIG. 7B, the key server 120 receives and processes the private key operation request 715. At operation 7.26, the key server 120 computes a third handshake hash (h3) as the hash of the second handshake hash (h2) concatenated with the ephemeral public key of the client network application 112 (E.Pub.I). At operation 7.27, the key server 120 computes a first chaining key (ck1) as the result of a 1-tuple HKDF taking as input the initial chaining key (ck0) and the ephemeral public key of the client network application 112 (E.Pub.I). The key server 120 performs the operations 7.28-7.47, which are the same as the operations 6.28-6.47, and will not be repeated for the sake of brevity.

The key server 120 transmits a response 720 to the tunnel application 117 that includes the static public key of the client network application 112 (S.Pub.I), the encrypted-empty value (Enc-Empty), and the transport keys. The tunnel application 117 receives the response 720 from the key server 120 and may perform the operations 7.48 and 7.49 to generate the first MAC and second MAC. Alternatively, the key server 120 may generate the first MAC and/or the second MAC and send the generated values in the response to the tunnel application 117.

The tunnel application 117 transmits a handshake response message 725 to the client network application 112. The handshake response message 725 takes the same form as the handshake response message 435 and includes the ephemeral public key of the tunnel application 117 (E.Pub.R), the encrypted empty (Enc-Empty), the first MAC, and the second MAC. Referring to FIG. 7C, the operations 7.52-7.66 performed by the client network application 112 are the same as the operations 4.52-4.66 and are not described herein again. The initial data packet 730 takes the same format as the initial data packet 440 and will not be described again. The tunnel application performs the operations 7.67 and 7.68, which are the same as the operations 4.67 and 4.68. Also, the data packet 735 takes the same format as the data packet 445.

Although FIG. 7C shows the client network application 112 transmitting an encrypted data packet 730 to the tunnel application 117 prior to the tunnel application 117 transmitting an encrypted data packet 735 to the client network application 112, the order of these packets may be switched. In other words, the tunnel application 117 may transmit an encrypted data packet over the established tunnel to the client network application 112 before the client network application 112 transmits an encrypted data packet over the established tunnel to the tunnel application 117.

Figure 8:
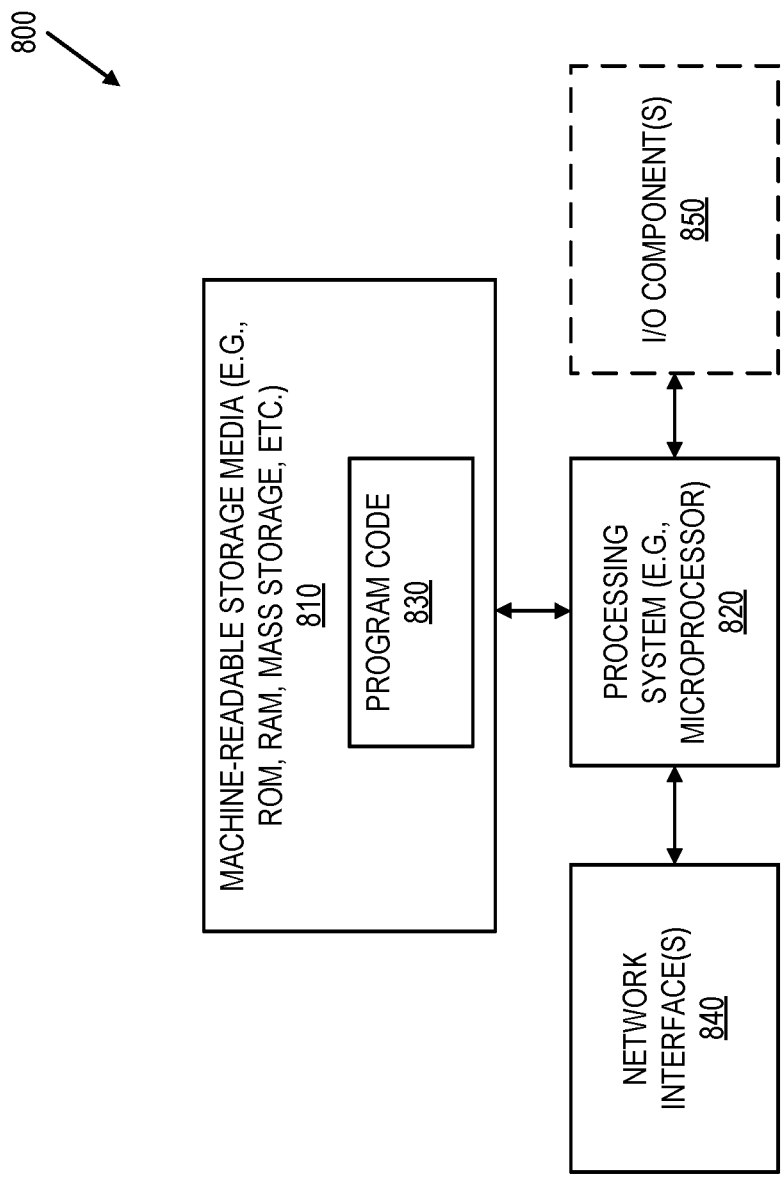
FIG. 8 illustrates a block diagram for an exemplary data processing system that may be used in some embodiments.

FIG. 8 illustrates a block diagram for an exemplary data processing system 800 that may be used in some embodiments. One or more such data processing systems 800 may be used to implement the embodiments and operations described with respect to the compute servers or other electronic devices. The data processing system 800 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 810 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 820 (e.g., one or more processors and connected system components such as multiple connected chips). For example, the depicted machine-readable storage media 810 may store program code 830 that, when executed by the processor(s) 820, causes the data processing system 800 to perform any of the operations described herein.

The data processing system 800 also includes one or more network interfaces 840 (e.g., a wired and/or wireless interfaces) that allows the data processing system 800 to transmit data and receive data from other computing devices, typically across one or more networks (e.g., Local Area Networks (LANs), the Internet, etc.). The data processing system 800 may also include one or more input or output ("I/O") components 850 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 800, and, in certain embodiments, fewer components than that shown in One or more buses may be used to interconnect the various components shown in FIG. 8.

The techniques shown in the figures can be implemented using code and data stored and executed on one or more electronic devices (e.g., a compute server, a client device, a router, an origin server). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

In the preceding description, numerous specific details are set forth in order to provide a more thorough understanding of the present embodiments. It will be appreciated, however, by one skilled in the art that the invention may be practiced without such specific details. In other instances, control structures, gate level circuits and full software instruction sequences have not been shown in detail in order not to obscure understanding of the embodiments. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting

What is claimed is:

1. A method in a key server, comprising:
    receiving, from a responder device, a first request for the key server, wherein the first request is responsive to a second request to the responder device to initiate a cryptographic tunnel between an initiator device and the responder device, wherein the first request is requesting the key server to use a static private key and an ephemeral public key of an ephemeral key pair of the initiator device in a plurality of cryptographic operations of an asymmetric cryptography algorithm, wherein the key server has access to the static private key to be used in the asymmetric cryptography algorithm, wherein the responder device does not have access to the static private key to be used in the asymmetric cryptography algorithm, and
    wherein the first request to initiate the cryptographic tunnel includes:
        the ephemeral public key of the initiator device,
        an encrypted static public key of the initiator device, and
        an encrypted timestamp;
    performing the plurality of cryptographic operations of the asymmetric cryptography algorithm using the static private key and the ephemeral public key of the initiator device; and
    transmitting, to the responder device, a response that is based on at least a result of the plurality of cryptographic operations of the asymmetric cryptography algorithm using the static private key.

2. The method of claim 1, further comprising:
    computing, a set of one or more transport keys for the responder device to use for sending and receiving data on the cryptographic tunnel; and
    transmitting, to the responder device, the set of one or more transport keys.

3. The method of claim 2, wherein the asymmetric cryptography algorithm uses the ephemeral public key in a series of Diffie-Hellman computations, and wherein at least one of the series of Diffie-Hellman computations affects at least a generation of a second set of one or more transport keys by an initiator device.

4. The method of claim 1, wherein the response comprises:
    an encrypted empty value; and
    a static public key of the initiator device.

5. The method of claim 1, wherein performing the plurality of cryptographic operations of the asymmetric cryptography algorithm using the static private key and the ephemeral public key of the initiator device further comprises:
    generating a shared secret key using the static private key and the ephemeral public key of the initiator device as inputs to a Diffie-Hellman computation, wherein the response includes the shared secret key.

6. The method of claim 1, further comprising:
    generating a Message Authentication Code (MAC), wherein the response to the responder device includes the generated MAC.

7. A non-transitory machine-readable storage medium that provides instructions that, if executed by a processor of a responder device, will cause the processor to perform operations comprising:
    receiving, from a responder device, a first request for a key server, wherein the first request is responsive to a second request to the responder device to initiate a cryptographic tunnel between an initiator device and the responder device, wherein the first request is requesting the key server to use a static private key and an ephemeral public key of an ephemeral key pair of the initiator device in a plurality of cryptographic operations of an asymmetric cryptography algorithm, wherein the key server has access to the static private key to be used in the asymmetric cryptography algorithm, wherein the responder device does not have access to the static private key to be used in the asymmetric cryptography algorithm, and
    wherein the first request to initiate the cryptographic tunnel includes:
        the ephemeral public key of the initiator device, an encrypted static public key of the initiator device, and
an encrypted timestamp;
performing the plurality of cryptographic operations of the asymmetric cryptography algorithm using the static private key and the ephemeral public key of the initiator device; and
transmitting, to the responder device, a response that is based on at least a result of the plurality of cryptographic operations of the asymmetric cryptography algorithm using the static private key.

8. The non-transitory machine-readable storage medium of claim 7, wherein the operations further comprise:
computing, a set of one or more transport keys for the responder device to use for sending and receiving data on the cryptographic tunnel; and
transmitting, to the responder device, the set of one or more transport keys.

9. The non-transitory machine-readable storage medium of claim 8, wherein the asymmetric cryptography algorithm uses the ephemeral public key in a series of Diffie-Hellman computations, and wherein at least one of the series of Diffie-Hellman computations affects at least a generation of a second set of one or more transport keys by an initiator device.

10. The non-transitory machine-readable storage medium of claim 7, wherein the response comprises:
an encrypted empty value; and
a static public key of the initiator device.

11. The non-transitory machine-readable storage medium of claim 7, wherein performing the plurality of cryptographic operations of the asymmetric cryptography algorithm using the static private key and the ephemeral public key of the initiator device further comprises:
generating a shared secret key using the static private key and the ephemeral public key of the initiator device as inputs to a Diffie-Hellman computation, wherein the response includes the shared secret key.

12. The non-transitory machine-readable storage medium of claim 7, wherein the operations further comprise:
generating a Message Authentication Code (MAC), wherein the response to the responder device includes the generated MAC.

13. A key server, comprising:
a processor; and
a non-transitory machine-readable storage medium that provides instructions that, when executed by the processor of a key server, will cause the processor to perform operations comprising:
receiving, from a responder device, a first request for the key server, wherein the first request is responsive to a second request to the responder device to initiate a cryptographic tunnel between an initiator device and the responder device, wherein the first request is requesting the key server to use a static private key and an ephemeral public key of an ephemeral key pair of the initiator device in a plurality of cryptographic operations of an asymmetric cryptography algorithm, wherein the key server has access to the static private key to be used in the asymmetric cryptography algorithm, wherein the responder device does not have access to the static private key to be used in the asymmetric cryptography algorithm, and wherein the first request to initiate the cryptographic tunnel includes:
the ephemeral public key of the initiator device,
an encrypted static public key of the initiator device, and
an encrypted timestamp;
forming the plurality of cryptographic operations of the asymmetric cryptography algorithm using the static private key and the ephemeral public key of the initiator device; and
transmitting, to the responder device, a response that is based on at least a result of the plurality of cryptographic operations of the asymmetric cryptography algorithm using the static private key.

14. The key server of claim 13, wherein the operations further comprise:
computing, a set of one or more transport keys for the responder device to use for sending and receiving data on the cryptographic tunnel; and
transmitting, to the responder device, the set of one or more transport keys.

15. The key server of claim 14, wherein the asymmetric cryptography algorithm uses the ephemeral public key in a series of Diffie-Hellman computations, and wherein at least one of the series of Diffie-Hellman computations affects at least a generation of a second set of one or more transport keys by an initiator device.

16. The key server of claim 13, wherein the response comprises:
an encrypted empty value; and
a static public key of the initiator device.

17. The key server of claim 13, wherein performing the plurality of cryptographic operations of the asymmetric cryptography algorithm using the static private key and the ephemeral public key of the initiator device further comprises:
generating a shared secret key using the static private key and the ephemeral public key of the initiator device as inputs to a Diffie-Hellman computation, wherein the response includes the shared secret key.

18. The key server of claim 13, wherein the operations further comprise:
generating a Message Authentication Code (MAC), wherein the response to the responder device includes the generated MAC.

* * * * *